United States Patent [19]

Schwaiger et al.

[11] Patent Number: 4,898,944
[45] Date of Patent: Feb. 6, 1990

[54] PRECURSORS FOR THE PREPARATION OF WATER-SOLUBLE TRIPHENDIOXAZINE DYESTUFFS

[75] Inventors: Günther Schwaiger, Frankfurt am Main; Hartmut Springer, Königstein/Taunus; Walter Helmling, Hofheim am Taunus, all of Fed. Rep. of Germany

[73] Assignee: Hoechst Aktiengesellschaft, Frankfurt am Main, Fed. Rep. of Germany

[21] Appl. No.: 263,613

[22] Filed: Oct. 27, 1988

Related U.S. Application Data

[62] Division of Ser. No. 909,010, Sep. 18, 1986, Pat. No. 4,786,728.

[30] Foreign Application Priority Data

Sep. 19, 1985 [DE] Fed. Rep. of Germany ....... 3533411
Jul. 26, 1987 [DE] Fed. Rep. of Germany ....... 3625347

[51] Int. Cl.$^4$ ............... C07C 147/103; C07C 147/107; C07C 147/12
[52] U.S. Cl. .................. 544/337; 260/507 R; 544/366; 544/398; 544/400; 544/401; 548/113; 548/260; 548/261; 558/22; 558/29; 558/30; 558/162; 558/164; 558/169; 558/175; 560/14; 560/100; 560/107; 560/254; 560/255; 560/308; 562/430; 562/42; 562/43; 564/282; 564/284; 564/285; 564/287; 564/340; 564/341; 564/430; 564/434; 564/440; 568/29; 568/30
[58] Field of Search .................. 260/507 R; 544/337, 544/366, 398, 400, 401; 548/113, 260, 261; 558/22, 29, 30, 162, 164, 169, 175; 560/14, 100, 107, 254, 255, 308; 562/430; 564/282, 284, 285, 287, 340, 341, 430, 434, 440; 568/29, 30

[56] References Cited

U.S. PATENT DOCUMENTS 4,577,015 3/1986 Jager et al. .......................... 544/76

Primary Examiner—Richard L. Raymond

[57] ABSTRACT

Precursors for the preparation of fiber-reactive triphendioxazine dyestuffs correspond to the general formulas:

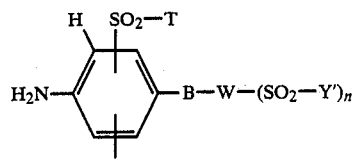

(4)

and

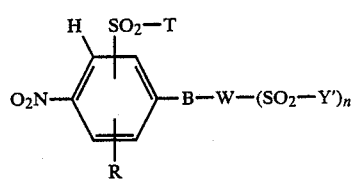

(8)

in which Y' is a vinyl, a beta-hydroxyethyl or an ethyl group which contains in the beta-position a substituent which can be eliminated by an alkali;

T is an optionally substituted alkyl (e.g. substituted with hydroxy) with 1–6 carbon atoms, preferably 1 to 4 carbon atoms, excluding a radical of the group Y' defined above, it also being possible for the alkyl group to be interrupted by hetero groups, preferably 1 to 2 hetero groups, selected from groups of the formulae —O—, —S—, —NH— and —N(R')—, where R' has the meaning given below, or T is an optionally substituted aryl group;

B is an oxygen or sulfur atom or an amino group of the formula —NH— or —N(R')—, in which
  R' is an alkyl group with 1 to 6 carbon atoms, preferably 1 to 4 carbon atoms, such as, in particular, the methyl or ethyl group, which can be substituted;

W is a divalent, optionally substituted aliphatic, optionally alkyl-substituted ($C_5$–$C_{10}$)-cycloaliphatic, optionally alkyl-substituted aliphatic-($C_5$–$C_8$)-cycloaliphatic, optionally substituted araliphatic or optionally substituted aromatic-carbocyclic radical or a benzotriazole radical combined with one of these radicals, it being possible for the aliphatic radicals in W to be interrupted by hetero groups, preferably 1 to 2 hetero groups, selected from the groups —O—, —S—, —SO$_2$—, —CO—, 1,4-piperidino, —NH— and —N(R$^o$)—, in which R$^o$ has one of the meanings of R' or is an alkanoyl group with 2 to 5 carbon atoms, such as an acetyl group, and/or it being possible for aliphatic and aryl radicals to be linked to one another by such a hetero group;

R' is a hydrogen atom or alkyl with 1 to 6 carbon atoms, preferably 1 to 4 carbon atoms, such as, in particular, methyl and ethyl of these, alkoxy with 1 to 5 carbon atoms, preferably 1 to 4 carbon atoms, such as, in particular, methoxy and ethoxy of these, halogen, such as fluorine or bromine or, in particular, chlorine, carboxy or sulfo;

n is the number 1 to 2, but is preferably 1.

10 Claims, No Drawings

PRECURSORS FOR THE PREPARATION OF WATER-SOLUBLE TRIPHENDIOXAZINE DYESTUFFS

This application is a division of our copending application Ser. No. 909,010, filed Sept. 18, 1986, now U.S. Pat. No. 4,786,728.

The present invention relates to the field of fiber-reactive dyestuffs.

Symmetrically built up fiber-reactive triphendioxazine dyestuffs are already known from European Patent Application Publication No. 0,141,996 A, but their properties are still in need of improvement.

Novel water-soluble triphendioxazine compounds corresponding to the general formula (1)

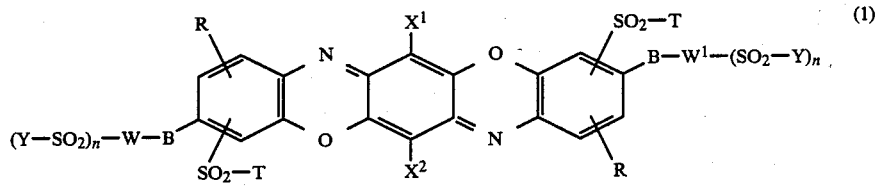

which have valuable fiber-reactive dyestuff properties, have now been found.

In this formula (1):

T is an optionally substituted alkyl group (including aralkyl) with 1 to 6 carbon atoms, preferably 1 to 4 carbon atoms, excluding a radical of the group Y defined below, it is also being possible for the alkyl group to be interrupted by hetero groups, preferably 1 or 2 hetero groups, selected from groups of the formulae —O—, —S—, —NH— and —N(R')—, where R' has the meaning given below, or T is an optionally substituted aryl group;

B is an oxygen or sulfur atom or an amino group of the formula —NH— or —N(R')—, in which R' is an alkyl group with 1 to 6 carbon atoms, preferably 1 to 4 carbon atoms, such as, in particular, the methyl or ethyl group, which can be substituted;

W is a divalent, optionally substituted aliphatic, optionally alkyl-substituted ($C_5$-$C_{10}$)-cycloaliphatic, optionally alkyl-substituted aliphatic-($C_5$-$C_8$)-cycloaliphatic, optionally substituted araliphatic or optionally substituted aromatic-carbocyclic radical or a benzotriazole radical combined with one of these radicals, it being possible for the aliphatic radicals in W to be interrupted by hetero groups, preferably 1 or 2 hetero groups, selected from the groups —O—, —S—, —$SO_2$—, —CO—, 1,4-piperidino, —NH— and —N($R^o$)—, in which $R^o$ has one of the meanings of R' or is an alkanoyl group with 2 to 5 carbon atoms, such as an acetyl group, and/or it being possible for aliphatic and aryl radicals to be linked to one another by such a hetero group;

$W^1$ has one of the meanings given for W and is identical to W or different from W;

R is a hydrogen atom or alkyl with 1 to 6 carbon atoms, preferably 1 to 4 carbon atoms, such as, in particular, methyl and ethyl of these, alkoxy with 1 to 5 carbon atoms, preferably 1 to 4 carbon atoms, such as, in particular, methoxy and ethoxy of these, halogen, such as fluorine or bromine or, in particular, chlorine, carboxy or sulfo;

$X^1$ is hydrogen atom or a halogen atom, such as fluorine or, in particular, a chlorine or bromine atom, a cycloalkyl group with 5 to 8 carbon atoms, such as the cyclohexyl group, an aralkyloxy group, an alkoxy group with 1 to 4 carbon atoms, such as the methoxy group, an aryloxy group, an alkyl group with 1 to 4 carbon atoms, such as the methyl group, an aryl group, an aralkyl group, a cyano group, a carboxy group, a carbalkoxy group with 2 to 5 carbon atoms, such as the carbomethoxy or carboethoxy group, an arylamino group, a carbamoyl group, an N-alkyl-carbamoyl group or N,N-dialkyl-carbamoyl group with alkyl radicals with in each case 1 to 4 carbon atoms, an N-aryl-carbamoyl group, an alkanoylamino group with 2 to 5 carbon atoms, such as the acetylamino group, or an aroylamino group, such as the benzoylamino group, the aryl radicals in these substituents mentioned preferably being phenyl radicals which can also be substituted by 1 or 2 substituents from the group comprising halogen, such as chlorine, nitro, alkyl with 1 to 4 carbon atoms, alkoxy with 1 to 4 carbon atoms, carboxy and sulfo, and $X^1$ preferably being a hydrogen atom, an alkanoylamino group with 2 to 5 carbon atoms, a phenoxy group, which can be substituted, an alkoxy group with 1 to 4 carbon atoms, an alkyl group with 1 to 4 carbon atoms or, particularly preferably, a chlorine atom or bromine atom;

$X^2$ is identical to $X^1$ or different from $X^1$ and has one of the meanings given for $X^1$;

the group —$SO_2$—T is preferably bonded in the ortho-position relative to the group —B—W—(-$SO_2$—Y)$_n$ and —B—$W^1$—($SO_2$—Y)$_n$;

n is the number 1 or 2, but is preferably 1;

Y is the vinyl group, or an ethyl group which contains, in the β-position, a substituent which can be eliminated by an alkali;

of the sulfo and sulfato groups which the molecule (1) can contain, the molecular (1) necessarily contains at least one, and preferably at least two.

The individual members of the formula, also those appearing twice, can have meanings which are identical to one another or different from one another.

A benzotriazole radical which is mentioned for $W^1$ and is combined with an aliphatic or aromatic radical is, for example, a radical of the general formula (2A)

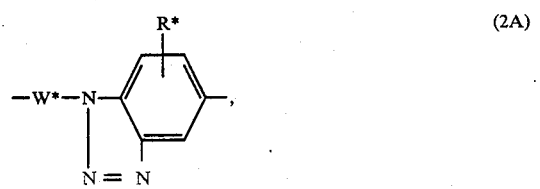

and correspondingly a benzotriazole radical which is mentioned for W and is combined with one of the aliphatic or aromatic radicals is, for example, a radical of the general formula (2B)

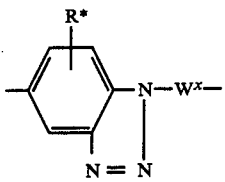

(2B)

in which W* and W$^x$ each denote a divalent, optionally substituted aliphatic, optionally alkyl-substituted ($C_5$–$C_{10}$)-cycloaliphtic, optionally alkyl-substituted aliphatic-($C_5$–$C_8$)-cycloaliphatic, optionally substituted araliphatic or optionally substituted aromatic-carbocyclic radical, it being possible for the aliphatic radicals in W* and W$^x$ to be interrupted by hetero groups, preferably 1 or 2 hetero groups, selected from the groups of the formulae —O—, —S—, —$SO_2$—, —CO—, 1,4-piperidino, —NH— and —N(R$^o$)—, where R$^o$ has the abovementioned meaning, and/or for aliphatic and aryl radicals to be linked to one another by such a hetero group, and in which R* in each case denotes a hydrogen atom, an alkyl group with 1 to 4 carbon atoms, such as the methyl or ethyl group, an alkoxy group with 1 to 4 carbon atoms, such as the methoxy or ethoxy group, a halogen atom, such as a chlorine atom, or a carboxy or sulfo group.

Aryl radicals in the groups mentioned above or below are, in particular, the phenyl and naphthyl radicals; they can be substituted, such as, for example, by substituents from the group comprising alkyl with 1 to 4 carbon atoms, such as methyl and ethyl, alkoxy with 1 to 4 carbon atoms, such as methoxy and ethoxy, halogen, such as chlorine and bromine, sulfo, carboxy, sulfamoyl, carbamoyl, carbamoyl which is mono- or disubstituted by phenyl, alkyl with 1 to 4 carbon atoms, phenylalkyl with an alkyl radical with 1 to 4 carbon atoms and/or cycloalkyl with 5 to 8 carbon atoms, sulfamoyl which is mono- or disubstituted by phenyl, alkyl with 1 to 4 carbon atoms, phenylalkyl with an alkyl radical with 1 to 4 carbon atoms and/or cycloalkyl with 5 to 8 carbon atoms, trifluoromethyl, benzoylamino, sulfobenzoylamino, alkanoylamino with 2 to 5 carbon atoms, nitro, amino and optionally mono- or disubstituted amino, its substituents being optionally substituted aliphatic (including araliphatic), optionally substituted aryl and ($C_5$–$C_8$)-cycloalkyl radicals.

Aryl radicals in the araliphatic radicals are, in particular, phenylene and naphthylene radicals; they can be substituted, such as, for example, by substituents from the group comprising alkyl with 1 to 4 carbon atoms, such as methyl and ethyl, alkoxy with 1 to 4 carbon atoms, such as methoxy and ethoxy, halogen, such as chlorine and bromine, sulfo, carboxy, sulfamoyl, carbamoyl, carbamoyl which is mono- or disubstituted by phenyl, alkyl with 1 to 4 carbon atoms, phenylalkyl with an alkyl radical with 1 to 4 carbon atoms and/or cycloalkyl with 5 to 8 carbon atoms, sulfamoyl which is mono- or disubstituted by phenyl, alkyl with 1 to 4 carbon atoms, phenylalkyl with an alkyl radical with 1 to 4 carbon atoms and/or cycloalkyl with 5 to 8 carbon atoms, trifluoromethyl, benzoylamino, sulfobenzoylamino, alkanoylamino with 2 to 5 carbon atoms, nitro, amino and optionally mono- or disubstituted amino, its substituents being optionally substituted aliphatic (including araliphatic), optionally substituted aryl and ($C_5$–$C_8$)-cycloalkyl radicals.

Aromatic-carbocyclic radicals are, for example, phenylene and naphthylene or phenyl and naphthyl radicals, which can be substituted, such as, for example, by substituents from the group comprising alkyl with 1 to 4 carbon atoms, such as methyl and ethyl, alkoxy with 1 to 4 carbon atoms, such as methoxy and ethoxy, halogen, such as chlorine and bromine, sulfo, carboxy, sulfamoyl, carbamoyl, carbamoyl which is mono- or disubstituted by phenyl, alkyl with 1 to 4 carbon atoms, phenylalkyl with an alkyl radical with 1 to 4 carbon atoms and/or cycloalkyl with 5 to 8 carbon atoms, sulfamoyl which is mono- or disubstituted by phenyl, alkyl with 1 to 4 carbon atoms, phenylalkyl with an alkyl radical with 1 to 4 carbon atoms and/or cycloalkyl with 5 to 8 carbon atoms, trifluoromethyl, benzoylamino, sulfobenzoylamino, alkanoylamino with 2 to 5 carbon atoms, nitro, amino and optionally mono- or disubstituted amino, its substituents being optionally substituted aliphatic (including araliphatic), optionally substituted aryl and ($C_5$–$C_8$)-cycloalkyl radicals. Particularly preferred radicals here are those phenylene or phenyl radicals which can be substituted by substituents from the group comprising alkyl with 1 to 4 carbon atoms, alkoxy with 1 to 4 carbon atoms and sulfo and/or by an optionally mono- or disubstituted amino group.

Aliphatic radicals are, for example, alkyl groups or alkylene groups with in each case 1 to 6 carbon atoms, preferably 1 to 4 carbon atoms, which can be substituted. Substituted alkyl and alkylene groups are, for example, those which can be substituted by 1 or 2 substituents from the group comprising chlorine, alkoxy with 1 to 4 carbon atoms, benzoylamino, sulfobenzoylamino, alkanoylamino with 2 to 5 carbon atoms, hydroxy, sulfato, phosphato, acetoxy, sulfo, carboxy or optionally substituted aryl. Preferred substituents here are the carboxy and sulfo groups and sulfato groups.

The formula members W and W$^1$ and W* and W$^x$ are, for example, alkylene groups with 1 to 6 carbon atoms, in particular 2 to 4 carbon atoms, it being possible for the alkylene chain to be interrupted by 1 or 2 hetero groups, which are preferably selected from the groups —O—, —NH— and —N(R')—, where R' has the above meaning, or an alkylene-phenylene, a phenylene-alkylene, a phenylene-alkylene-phenylene or an alkylene-phenylene-alkylene radical, the alkylene radicals in these araliphatic radicals being those with 1 to 6, preferably 1 to 4, carbon atoms and it being possible for them to be optionally substituted by the substituents mentioned and/or interrupted by one or two of the hetero groups mentioned, and it being possible for the benzene nuclei in each case to be further substituted by 1 or 2 substituents selected from the group of substituents comprising sulfo, carboxy, sulfamoyl, carbamoyl, methyl, ethyl, methoxy, ethoxy, nitro, chlorine, amino and amino which is substituted by optionally substited aliphatic and/or optionally substituted aryl radicals, and, in the case where an alkylene group is interrupted by hetero groups, its alkylene portions in this are preferably those with 2 or 3 carbon atoms, and it being possible for the aliphatic and aryl radicals also to be bonded via an oxygen atom or a group —NH—. The formula members W and W$^1$ and W* and W$^x$ are furthermore, for example, a phenylene radical, in particular a meta- or para-phenylene radical, which can be further substituted by 1 or 2 substituents from the group comprising sulfo, carboxy, sulfamoyl, carbamoyl, methyl, ethyl, methoxy, ethoxy, chlorine, amino and amino which is substituted by optionally substituted aliphatic and/or optionally substituted aryl radicals, but the phenylene radical preferably being substituted by sulfo, or the formula members are a naphthylene radical which is optionally substituted by sulfo.

Preferably, W or $W^1$, $W^*$ and $W^x$ are an alkylene radical with 2 to 4 carbon atoms, which can be substituted by 1 or 2 substituents, preferably one substituent, from the group comprising sulfo, sulfato, carboxy, phenyl and sulfophenyl, or W or $W^1$ is a phenylene radical which can be substituted by 1 or 2 substituents, preferably one substituent, from the group comprising sulfo, carboxy, methyl, methoxy, ethoxy and chlorine, or W or $W^1$, $W^*$ and $W^x$ are preferably an alkylenephenylene radical from these radicals mentioned, bonded directly with one another or via an oxygen atom or a group —NH—.

The fiber-reactive groups of the formula $-SO_2-Y$ are bonded to aliphatic and/or aromatic carbon atoms, preferably aromatic carbon atoms, of W and $W^1$.

Radicals $W^*$ are, for example, the meta- or para-phenylene radical, the 1,2-ethylene, 1,3-propylene, 1,4-butylene, 1,5-pentylene, 1,6-hexylene, 2-methyl-1,3-propylene, 2-sulfophenyl-1,3-propylene and 2-sulfato-1,3-propylene radical, and furthermore, for example, a sulfo-substituted 1,4-phenylene radical, a 1,4- and 1,3-cyclohexylene radical or a divalent radical of the formula (a*) to (z*) given below, and of these preferably the 1,2-ethylene, 1,3-propylene and 1,4-butylene radical, a radical of the formulae (a*), a 2-sulfophenyl-1,3-propylene and a 2-sulfato-1,3-propylene radical and a sulfo-substituted 1,4-phenylene radical:

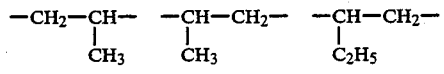

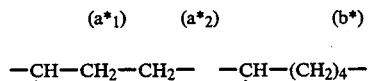

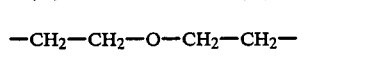

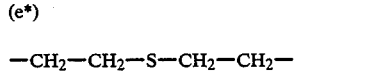

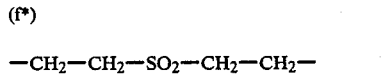

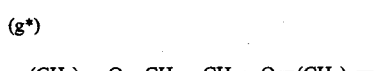

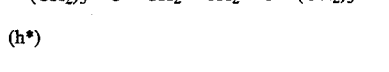

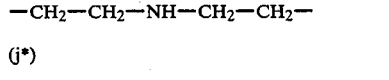

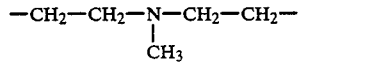

-continued

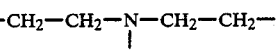

(m*)

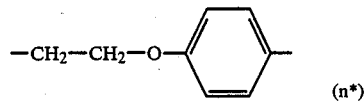

(n*)

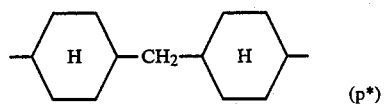

(p*)

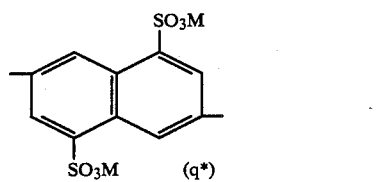

(q*)

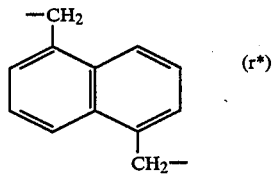

(r*)

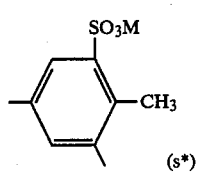

(s*)

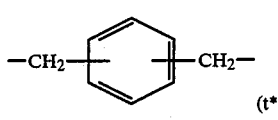

(t*)

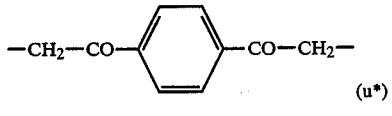

(u*)

(v*)

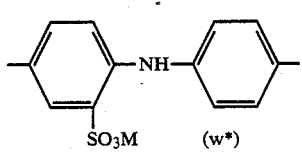

(w*)

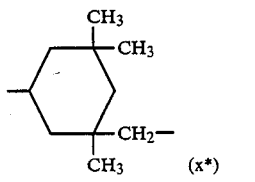

(x*)

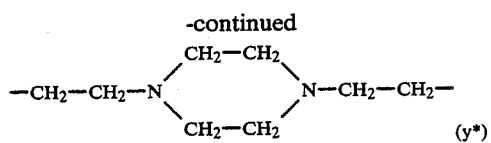 (y*)

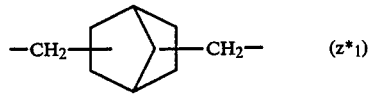 (z*₁)

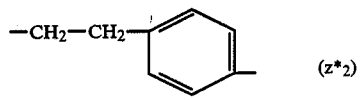 (z*₂)

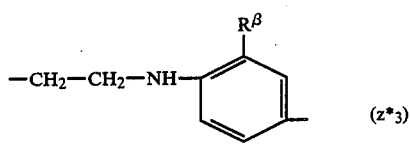 (z*₃)

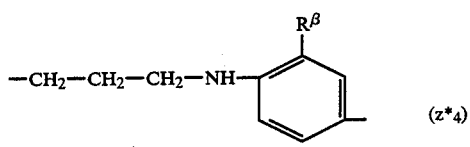 (z*₄)

in which M has one of the meanings given below and $R^\beta$ represents hydrogen or sulfo.

The radicals $W^x$ are, for example, the groups which have just been mentioned for $W^*$ but are arranged as "mirror images".

Radicals $W^1$ are, for example, the meta- or para-phenylene radical, the 1,2-ethylene and 1,3-propylene radical or a divalent radical of the formulae (a) to (z) given below, $W^1$ preferably being a radical of the formula (b), (g), (m), (q), (x), (y) or (z):

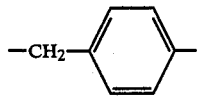 (a)

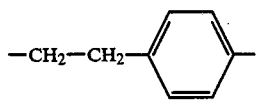 (b)

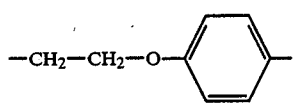 (c)

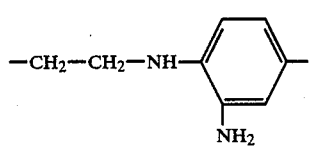 (d)

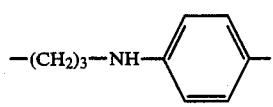 (e)

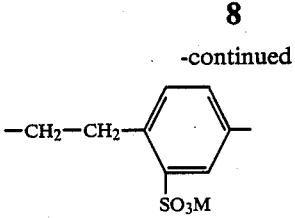 (f)

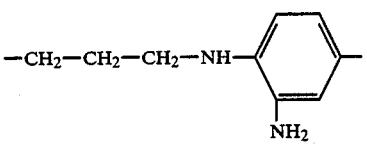 (d₁)

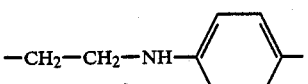 (e₁)

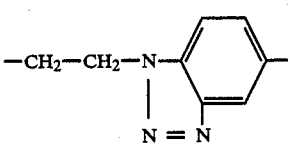 (g)

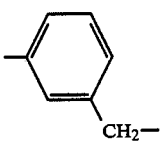 (h)

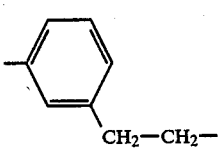 (j)

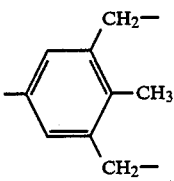 (k)

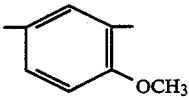 (m)

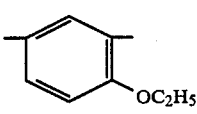 (n)

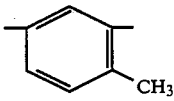 (p)

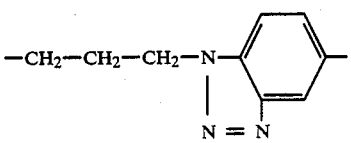 (q)

-continued

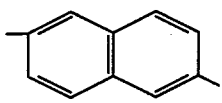 (r)

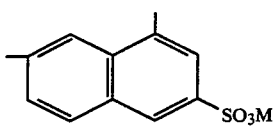 (s)

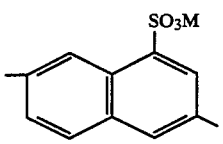 (t)

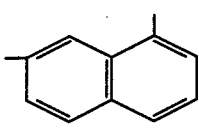 (u)

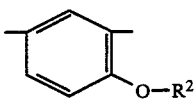 (v)

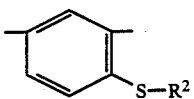 (w)

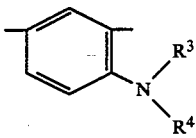 (x)

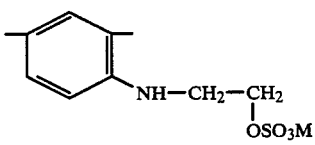 (y)

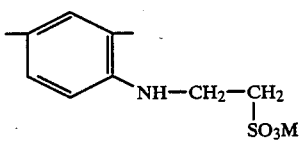 (z)

wherein M has one of the meanings given below, $R^2$ is a β-sulfatoethyl group, $R^3$ is hydrogen or alkyl with 1 to 4 carbon atoms which can be substituted, such as, for example, by sulfo, carboxy, sulfato, phenyl or sulfophenyl, preferably sulfo or carboxy, and $R^4$ denotes alkyl which has 1 to 4 carbon atoms and can be substituted, such as by sulfo, carboxy, sulfato, phenyl and sulfophenyl, preferably sulfo or carboxy, or denotes phenyl which is optionally substituted, such as by sulfo or carboxy, the amino group of the general formula —$NR^3R^4$ being, for example, an ethylamino, diethylamino, β-sulfatoethylamino, β-sulfoethylamino, N-methyl-N-β-sulfoethylamino or N-methyl-N-β-sulfatoethylamino group.

The radicals W are, for example, the groups which have just been mentioned for $W^1$ but are arranged as "mirror images".

The formula radical T is preferably an alkyl group with 2 to 6, particularly preferably 2 or 3, carbon atoms, which is substituted by a sulfo or carboxy group.

Substituents which, according to the formula member Y, are bonded in the β-position of the ethyl group and can be eliminated by an alkali to form the vinyl group are, for example, alkanoyloxy groups with 2 to 5 carbon atoms, such as the acetoxy group, aroyloxy groups, such as the benzoyloxy, sulfobenzoyloxy or carboxybenzoyloxy group, dialkylamino groups with alkyl groups of 1 to 4 carbon atoms, such as, in particular, the dimethylamino and diethylamino group, trialkylammonium groups with alkyl groups of 1 to 4 carbon atoms, such as the trimethylammonium group, the chlorine atom, the bromine atom, alkylsulfonyloxy groups with alkyl groups of 1 to 4 carbon atoms, a phosphato group, a thiosulfato group or a sulfato group. Of the groups corresponding to the formula member Y, the β-chloroethyl, β-phosphatoethyl, β-acetoxyethyl and β-thiosulfatoethyl group are preferred, the vinyl group is particularly preferred and the β-sulfatoethyl group is especially preferred.

The two formulae radicals Y in the general formula (1) can have meanings identical to one another or different from one another; preferably, they have the same meaning. The formulae radicals (Y—$SO_2$)$_n$—W—B— and —B—$W^1$—($SO_2$—Y)$_n$ can likewise have meanings which are identical to one another or different from one another; preferably, they have the same meanings. The formulae radicals —$SO_2$—T can likewise have meanings which are identical to one another or different from one another; preferably, they have the same meaning.

Sulfo groups are groups corresponding to the general formula —$SO_3M$, carboxy groups are groups corresponding to the general formula —COOM, sulfato groups are groups corresponding to the general formula —$OSO_3M$, thiosulfato groups are groups corresponding to the general formula —S—$SO_3M$ and phosphato groups are groups corresponding to the general formula —$OPO_3M_2$, M here, and also below, having the following meaning:

M is a hydrogen atom or an alkali metal, such as sodium, potassium and lithium, or the equivalent of an alkaline earth metal, such as, for example, of calcium, but in particular is an alkali metal.

In the general formula (1), R is preferably a hydrogen atom, and furthermore B is preferably an amino group —NH—, and moreover the radical $W^1$ is preferably a radical of the above formula (b), (m), (y) or (z) and W is preferably a corresponding radical with a "mirror image" structure; the formula radical T is furthermore preferably a β-sulfoethyl group.

Of the triphendioxazine compounds according to the invention, particular emphasis should go to those which correspond to the general formula (1a)

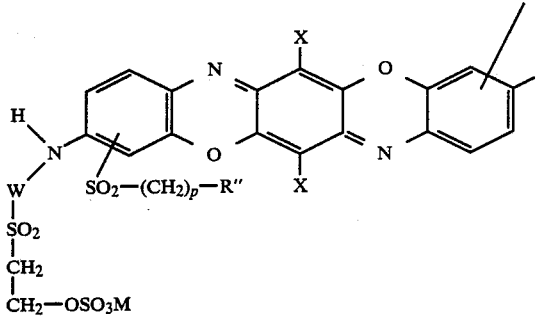

(1a)

in which
X represents a bromine atom or, preferably, a chlorine atom,
M is a hydrogen atom or, preferably, an alkali metal atom, such as, in particular, sodium,
p represents the number 2 or 3, preferably 2,
R" denotes a sulfo, sulfato or carboxy group, preferably a sulfo group, but in the case of p=2 does not denote a sulfato group,
$W^1$ represents a phenylene radical, preferably a meta-phenylene radical, which can be substituted by methyl, ethyl, chlorine, methoxy or ethoxy, preferably by a methoxy group, such as a radical of the formula (m), or a group of the formula (2a), (2b) or (2c)

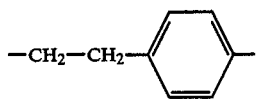 (2a)

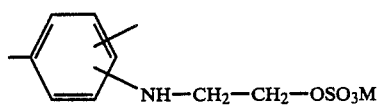 (2b)

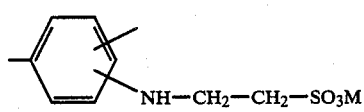 (2c)

or of the above formula (g) or (q),
where M has the abovementioned meaning, the phenylene radical in the formula (2b) and (2c) preferably being a meta-phenylene radical and the amino group being preferably in the para-position to the other amino group corresponding to the formula radical B, and
W represents a radical which has been mentioned for $W^1$ but is arranged as a "mirror image".

The novel dioxazine compounds can exist both in acid form and in the form of their salts. They are preferably in the form of the salts, in particular the alkali metal salts, and are also preferably used in the form of these salts for dyeing (understood here and below in th general sense and including printing) of materials containing hydroxy and/or carboxamide groups, in particular fiber materials.

The present invention furthermore relates to a process for the preparation of the compounds of the general formula (1) mentioned above and defined, which comprises cyclizing a compound of the general formula (3)

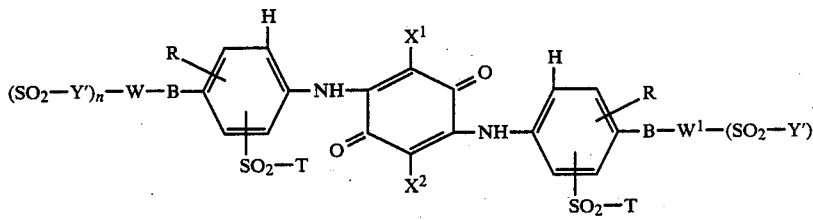

(3)

(in which Y' is the vinyl group, the β-hydroxy-ethyl group or an ethyl group which contains, in the β-position, a substituent which can be eliminated by an alkali, such as one of those mentioned for Y, preferably is the β-hydroxyethyl group, and n, R, B, W, $W^1$, T, $X^1$ and $X^2$ have the abovementioned meanings. it being possible for substituted alkyl groups in these radicals also to be hydroxy-substituted alkyl groups, the groups —$SO_2$—T preferably being bonded in the ortho-position relative to the group (Y'—$SO_2$)$_n$—W—B— and —B—$W^1$—(-$SO_2$—Y')$_n$) in an acid medium and preferably in the presence of an oxidizing agent to give the triphendioxazine. The reaction is carried out by a procedure which is known per se, thus, for example, in sulfuric acid or sulfuric acid containing sulfur trioxide, as the reaction medium, the oxidizing agents used being sulfur trioxide, ammonium or alkali metal persulfates, iodine or inorganic iodine compounds in the presence of oleum, sodium borate or, preferably, sodium peroxodisulfate or potassium peroxodisulfate (corresponding to the formula $Na_2S_2O_8$ or $K_2S_2O_8$). Such procedures are known, for example, from British Patent No. 1,589,915 and European Patent Application Publication No. 0,141,359A.

Preferably, the reaction is carried out in concentrated sulfuric acid, such as 96% to, preferably, 100% strength sulfuric acid, and in particular in sulfuric acid containing sulfur trioxide (oleum), such as up to 50% strength by weight oleum. The reaction temperature is chosen between 0° and 80° C. The oleum used as the reaction medium and agent as a rule contains 5 to 30% by weight, preferably 10 to 20% by weight, of sulfur trioxide. If peroxodisulfate is added as the oxidizing agent, the cyclization is carried out between 0° and 40° C., preferably between 15° and 25° C. If oleum/peroxodisulfate is used, the reaction temperature should not exceed 30° C. 10 to 20% strength oleum using an amount of peroxodisulfate equivalent to the compound (3) is preferred. If iodine is the oxidizing agent, this is used in catalytic amounts in 10 to 50% strength oleum; the reaction temperature here is as a rule between 0° and 40° C.

If appropriate, any hydroxyalkyl groups present, such as, for example, the β-hydroxyethyl group of the formula radical Y', can be esterified by means of a sulfating or phosphating agent, such as 96–100% strength sulfuric acid or sulfuric acid containing sulfur trioxide or polyphosphoric acid, to give the corresponding β-sulfatoalkyl or β-phosphatoalkyl groups before or at the same time as the cyclization or after the cyclization reaction. Thus, if the cyclization is carried out in sulfuric acid or oleum as the reaction medium, hydroxy groups bonded to an alkyl radical of the molecule, such as, for example, the above-mentioned β-hydroxyethyl groups of the formula radical Y' or hydroxyalkyl groups of the formulae radicals W and $W^1$ and T, are converted into the corresponding sulfatoalkyl groups.

According to the invention, sulfo groups can also be introduced into the aromatic rings of the triphendioxazine (including the corresponding aryl radicals of W, $W^1$, T, $X^1$ and $X^2$) at temperatures above about 35° C., such as at temperatures between 40° and 60° C.

Compounds of the formula (1) where Y is a β-sulfatoethyl group can then be converted by known procedures into other compounds of the formula (1) according to the invention in which Y represents the vinyl group or an ethyl group with another substituent in the β-position which can be eliminated with an alkali.

The compounds of the general formula (3) can be prepared by procedures analogous to known procedures, by reacting a compound of the general formula (4)

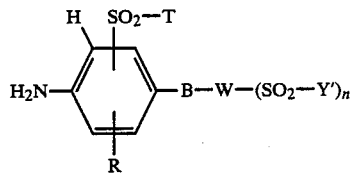

(or those with $W^1$ instead of W), in which Y' has the abovementioned meaning and is preferably the β-hydroxyethyl group and n, R, B, W, $W^1$ and T have the abovementioned meanings, it being possible for substituted alkyl groups in these radicals also to be hydroxy-substituted alkyl groups and the groups —$SO_2$—T preferably being bonded in the ortho-position relative to the group (Y'—$SO_2$)$_n$—W—B— and —B—$W^1$—(-$SO_2$—Y')$_n$, with a 1,4-benzoquinone compound of the general formula (5)

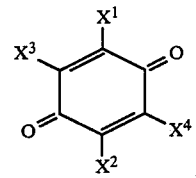

in which $X^1$ and $X^2$ have the abovementioned meanings and $X^3$ and $X^4$ are identical to one another or different from one another, and each represents a hydrogen atom, an alkoxy group with 1 to 4 carbon atoms, such as, in particular, the methoxy group, or a phenoxy group, or is preferably a halogen atom, such as a fluorine atom or, in particular, a bromine atom and especially a chlorine atom, it also being possible for $X^3$ and $X^4$ to have a meaning identical to that of $X^1$ and $X^2$.

The reaction of a compound of the general formula (4) or of two different amino compounds of the general formula (4), in each case in twice the equivalent amount in total, with one equivalent of a compound of the general formula (5) to give a compound of the general formula (3) is carried out by procedures analogous to known procedures which are described, for example, in K. Venkataraman "The Chemistry of Synthetic Dyes", Volume V, pages 419–427 (1971), and in Ullmanns Encyklopädie der technischen Chemie (Ullmann's Encyclopedia of Industrial Chemistry), 4th edition, Volume 8, pages 240+241 (1974), and in British Patent Application Publication No. 2,019,872, German Offenlegungsschrift No. 2,823,828 and European Patent Application Publication No. 0,141,996A. For example, the reaction can be carried out in an aqueous medium or in an aqueous-organic medium or in a purely organic medium, the organic solvents being polar aprotic or protic solvents, such as, for example, lower alkanols, such as methanol and ethanol, or halogenated benzenes, such as o-dichlorobenzene. Preferably, however, the quinone of the formula (5) is employed in a larger or smaller excess, which as a rule is 2–20%, but can also be up to 100% or more, depending on the quinone chosen. The reaction of the amines (4) with the quinones (5) can be carried out at a temperature between 20° and 100° C., preferably between 50° and 70° C., in the presence of an acid-binding agent, such as, for example, an alkali metal carbonate or acetate or an alkaline earth metal carbonate or acetate, thus, for example, sodium acetate, sodium carbonate or sodium bicarbonate, or an alkali metal hydroxide or alkaline earth metal hydroxide, such as sodium hydroxide, or an oxide of an alkaline earth metal, such as, for example, magnesium oxide. If the reaction is carried out in an aqueous or aqueous-organic medium, a pH range of between 4 and 7, preferably between 5.5 and 6.5, is established.

The aniline starting compounds of the general formula (4) have not yet been disclosed. The invention thus also relates to these compounds, process for their preparation and their use for the synthesis of dyestuffs. They can be prepared by procedures analogous to known procedures for the reaction of nitrochlorobenzenes with amines, thus, for example, by reacting a chloronitrobenzene of the general formula (6)

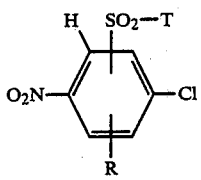

(6)

in which R and T have the abovementioned meanings, with an amine of the general formula (7)

in which B, W, Y' and n have the abovementioned meanings, in water or an organic medium, such as an alkanol, for example methanol, dioxane and toluene, or a mixture of water and water-miscible organic solvents, with the addition of a basic, acid-binding agent, such as, for example, potassium carbonate, magnesium oxide, sodium carbonate or sodium hydroxide, or also triethylamine or triethanolamine, at a temperature between 50° and 120° C., if appropriate under pressure, preferably between 70° and 120° C. In an aqueous medium, a pH of between 6 and 12, preferably between 8 and 10, is maintained.

The nitro-aniline compounds thus obtainable, are likewise novel compounds according to the invention and have the general formula (8)

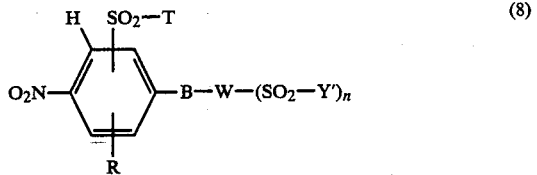

(8)

in which R, T, B, W, Y' and n have the abovementioned meanings, can then be reduced by methods which are customary per se for reduction of aromatic nitro groups by means of hydrogen and a metallic catalyst, such as a palladium, platinum or Raney nickel catalyst, under pressure in an autoclave, or by means of Béchamp reduction using iron filings, to give the compound corresponding to the general formula (4) in which Y' preferably represents the β-hydroxy-ethyl group. The corresponding fiber-reactive starting compounds (4) in which Y' represents the vinyl group or an ethyl group which contains, in the β position, a substituent which can be eliminated by an alkali, can then be prepared from the β-hydroxy-ethylsulfonyl compounds of the general formula (4) by the generally known procedure of conversion of the β-hydroxyethylsulfonyl group into such groups. Preferably, the β-hydroxy-ethylsulfonyl group is converted into the β-sulfatoethylsulfonyl group.

Chloronitrobenzene compounds of the general formula (6) can be prepared, for example, by a synthesis analogous to the possible syntheses for the preparation of sulfones, such as, for example, in Houben-Weyl, Methoden der Organischen Chemie (Methods of Organic Chemistry), Volume IV, page 231 et seq. (1955) and Volume E11, page 1132 et seq. (1985), thus, via the sulfinic acid derivative, such as in a procedure which is known per se by reduction of a corresponding 1-chloro-4-nitro-benzenesulfonyl chloride compound by means of sodium sulfate to give the corresponding sulfinic acid and subsequent oxyalkylation of the sulfinic acid to give the β-hydroxyalkylsulfonyl compound, which is then sulfated. The sulfato group can then be converted into the sulfo group by customary methods by means of sodium sulfite. Thus, for example, 2(β-sulfoethylsulfonyl)-4-nitro-chlorobenzene can be prepared by reaction of 2-(β-sulfatoethylsulfonyl)-4-nitro-chlorobenzene which is obtainable from 1-chloro-4-nitrobenzenesulfonyl chloride by the abovementioned method, with an aqueous sodium sulfite solution at a temperature between 30° and 50° C. and a pH between 6 and 9.5. The carboxy-substituted alkylsulfone compounds can also be prepared from the sulfinic acid compounds, for example by reaction with chloroacetic acid, acrylic acid or crotonic acid.

Some of the compounds of the general formula (6) can also be obtained by nitration of a corresponding alkylsulfonyl or arylsulfonyl-chlorobenzene compound in a manner which is customary per se, thus, for example, analogously to the instructions of Example 5 of German Patent 859,462.

Aniline starting compounds of the general formula (4) are, for example, 3-(β-carboxyethylsulfonyl)-4-β[4'-(β'-hydroxyethylsulfonyl)-phenyl]-ethylamino-aniline, 3-(β-sulfoethylsulfonyl)-4-β-]5'-(β-hydroxyethylsulfonyl)benzotriazol-1'-yl]-ethylamino-aniline, 3-(β-sulfoethylsulfonyl)-4-γ-[5'-β-hydroxyethylsulfonyl)-benzotriazol-1'-yl]-propylamino-aniline, 3-(β-sulfo-propylsulfonyl)-4-β-[4'-(β'-hydroxyethylsulfonyl)-phenyl]-ethylamino-aniline, 3-(β-sulfoethylsulfonyl)-4-[3'-β-hydroxy-ethylsulfonyl-4-(N-methyl-N-β-sulfoethyl)-amino-phenylamino]-aniline, 3-(β-sulfoethylsulfonyl)-4-[3'-β-hydroxyethylsulfonyl-4'-ethylamino]-phenylamino-aniline, 3-(β-sulfoethylsulfonyl)-4-[β-(β'-hydydroxyethylsulfonyl)-ethylamino]-aniline, 3-(β-sulfoethylsulfonyl)-4-[γ-(β'-hydroxyethylsulfonyl)-propylamino]-aniline, 3-(β-sulfoethylsulfonyl)-4-[(4'-β-hydroxyethylsulfonyl-phenyl)-methylamino]-aniline, 3-(β-sulfoethylsulfonyl)-4-[β-(4'-β'-hydroxyethylsulfonylphenoxy)ethylamino]-aniline, 3-(β-sulfoethylsulfonyl)-4-[γ-(2'-amino-4'-β'-hydroxyethylsulfonylphenylamino)-propylaminoaniline, 3-(β-sulfoethylsulfonyl)-4-[3'-(β-hydroxyethylsulfonyl)-phenylamino]-aniline, 3-(β-sulfoethylsulfonyl)-4-[3'-(β-hydroxyethylsulfonyl)-4-methyl-phenylamino]-aniline, 3-(β-sulfoethylsulfonyl)-4-[6'-(β-hydroxyethylsulfonyl)-8'-sulfonaphth-2'-yl-amino]-aniline, 3-(β-sulfoethylsulfonyl)-4-[8'-(β-hydroxyethylsulfonyl)-6'-sulfo-naphth-2'-ylamino]-aniline, 3-(β-sulfoethylsulfonyl)-4-[6',8'-di-(β-hydroxyethylsulfonyl)-naphth-2'-ylamino]-aniline and, in particular, 3-(β-sulfoethylsulfonyl)-4-[β-(4'-β'-hydroxyethylsulfonyl-phenyl)-ethylamino]-aniline, 3-(β-sulfoethylsulfonyl)-4-[3'-(β-hydroxyethylsulfonyl)-4-methoxy-phenylamino]-aniline, 3-(β-sulfoethylsulfonyl)-4-[3'-(β-hydroxyethylsulfonyl)-4'-(β-hydroxyethylamino)-phenylamino]-aniline and 3-(β-sulfoethylsulfonyl)-4-[3'-(β-hydroxyethylsulfonyl)-4'-(β-sulfoethylamino)-phenylamino]-aniline.

Numerous benzoquinones of the general formula (5) used as starting compounds are known in the literature. Compounds of this type are, for example, 1,4-benzoquinone, 2-methyl-1,4-benzoquinone, 2-ethyl-1,4-benzoquinone, 2-n-propyl-1,4-benzoquinone, 2-isopropyl-1,4-benzoquinone, 2-(β-ethoxyethyl)-1,4-benzoquinone, 2-phenyl-1,4-benzoquinone, 2-(4'-methylphenyl)-1,4-benzoquinone, 2-(4'-methoxyphenyl)-1,4-benzoquinone, 2-(3'-chlorophenyl)-1,4-benzoquinone, 2-(4'-nitrophenyl)-1,4-benzoquinone, 2,5-dimethyl-1,4-benzoquinone, 2-methyl-5-ethyl-1,4-benzoquinone, 2-methyl-3-chloro-1,4-benzoquinone, 2-methyl-6-chloro-1,4-benzoquinone, 2-methyl-3,5-dichloro-1,4-benzoquinone, 2-methyl-3,5,6-tribromo-1,4-benzoquinone, 2-(4'-methylphenoxy)-3,6-dibromo-1,4-benzoquinone, 2-(3'-methylphenoxy)-3,6-dibromo-1,4-benzoquinone, 2-methyl-3,5,6-trichloro-1,4-benzoquinone, 2-methyl-3-chloro-5-bromo-1,4-benzoquinone, 2-methyl-3,6-dichloro-1,4-benzoquinone, 2-methyl-3,6-dichloro-5-bromo-1,4-benzoquinone, 2-phenyl-3,6-dichloro-1,4-benzoquinone, 2-(4'-methoxyphenyl)-3,6-dichloro-1,4-benzoquinone, 2-(4'-chlorophenyl)-3,6-dichloro-1,4-benzoquinone, 2-(4'-nitrophenyl)-3,6-dichloro-1,4-benzoquinone, 2-(4'-nitrophenyl)-3,5,6-trichloro-1,4-benzoquinone, 2,5-dimethyl-3,6-dibromo-1,4-benzoquinone, 2,5-dimethyl-3-chloro-1,4-benzoquinone, 2-methyl-5-n-propyl-6-bromo-1,4-benzoquinone, 2-methyl-5-isopropyl-3-chloro-1,4-benzoquinone, 2-methyl-5-isopropyl-6-bromo-1,4-benzoquinone, 2-(2'-chlorophenyl)-3,5,7-tribromo-1,4-benzoquinone, 2-methyl-3-methoxy-1,4-benzoquinone, 2,3,5,6-tetramethoxy-1,4-benzoquinone, 2,3,5,6-tetraphenoxy-1,4-benzoquinone, 2,3,5,6-tetra-(4'-methylphenoxy)-1,4-benzoquinone, 2,3,5,6-tetra-(4'-methoxyphenoxy)-1,4-benzoquinone, 2,3,5,6-tetra-(4'-chlorophenoxy)-1,4-benzoquinone, 2,3,5,6-tetra-4-(3'-methyl-4'-chlorophenoxy)-1,4-benzoquinone, 2-ethyl-3,6-dimethoxy-1,4-benzoquinone, 2-chloro-3,6-dimethoxy-1,4-benzoquinone, 2,3,5-trimethoxy-1,4-benzoquinone, 2,5-dimethyl-3,6-dimethoxy-1,4-benzoquinone, 2,5-dimethyl-3,6-dimethoxy-1,4-benzoquinone, 2-methyl-3,6-dimethoxy-1,4-benzoquinone, 2-methyl-5,6-dimethoxy-1,4-benzoquinone, 2-ethyl-3,6-dimethoxy-1,4-benzoquinone, 2-chloro-3-n-propyl-5-methoxy-1,4-benzoquinone and 2-chloro-3,5-dimethoxy-1,4-benzoquinone, 2,3,5,6-tetrafluoro-1,4-benzoquinone and, preferably, 2,3,5,6-tetrabromo-1,4-benzoquinone and, in particular, 2,3,5,6-tetrachloro-1,4-benzoquinone.

Starting compounds of the general formula (7) mentioned above and defined which contain the fiber-reactive radical of the vinylsulfone series or the β-hydroxyethylsulfonyl derivative thereof are likewise known in the literature or can be prepared by procedures analogous to those described in the literature. Such compounds are, preferably, β-(4-β'-hydroxyethylsulfonyl-phenyl)-ethylamine, 3-(β-hydroxyethylsulfonyl)-4-methoxy-aniline, 3-(β-hydroxyethylsulfonyl)-4-(β-hydroxyethylamino)-aniline and 3-(β-hydroxyethylsulfonyl)-4-(β-sulfoethylamino)-aniline, and furthermore β-[5-(β-hydroxyethylsulfonyl)-benzotriazol-1-yl]-ethylamine, γ-[5-β-hydroxyethylsulfonyl)-benzotriazol-1-yl]-n-propyl-amine, the ω-[5-(β-hydroxyethylsulfonyl)-benzotriazol-1-yl]-C₄-C₆-n-alkylamines, β-[5-(β-hydroxyethylsulfonyl)-benzotriazol-1-yl]-ethanol, the ω-[5-(β-hydroxyethylsulfonyl)-benzotriazol-1-yl]-C₃-C₆-n-alkanols, β-[5-(β-hydroxyethylsulfonyl)-benzotriazol-1-yl]-n-propylamine, 4-[5'-(β-hydroxyethylsulfonyl)-benzotriazol-1'-yl]-cyclohexylamine β-{4-[5'-(β-hydroxyethylsulfonyl)-benzotriazol-1'-yl]-phenylamino}-ethylamine, β-{4-[5'-(β-hydroxyethylsulfonyl)-benzotriazol-1'-yl]-phenylamino}-ethanol, 4-[5'-(β-hydroxyethylsulfonyl)-benzotriazol-1'-yl]-phenethylamine, β-(4-β'-hydroxyethylsulfonylphenyl)-ethylamine, β-(4-β'-hydroxyethylsulfonyl)-benzylamine, β-(2-sulfo-4-β'-hydroxyethylsulfonyl-phenyl)-ethylamine and the other amino compounds of β-hydroxyethylsulfonyl derivatives thereof which can be seen in numerous cases from the examples.

Starting compounds of the general formula (7) which contain the benzotriazole radical, that is to say compounds of the general formula (7a)

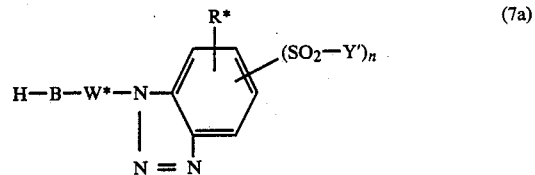

in which B, W*, Y' and n have the abovementioned meanings, have not yet been described. They can be prepared by procedures analogous to known procedures, by reacting a compound of the general formula (9)

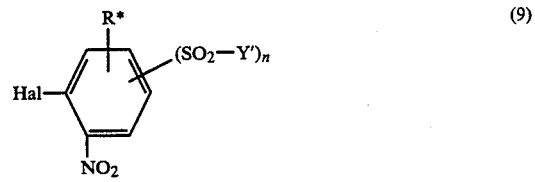

in which R*, Y' and n have the abovementioned meanings and Hal represents a fluorine or bromine atom, with a compound of the general formula A—B—W*—NH₂, in which A is a hydrogen atom or acyl radical, such as an acetyl or benzoyl radical, and B and W* have the abovementioned meanings, and B is preferably the group NH, in a suitable solvent for these reactants in the presence of an acid-binding agent at a temperature between 30° and 120° C., preferably between 70° and 90° C.

Starting compounds corresponding to the formula A—B—W*—NH₂ are, for example, 1,2-diamino-ethane, 1,3-diamino-propane, 1,4-diamino-butane, 1,5-diamino-pentane, 1,6-diamino-hexane, 1,2-diamino-propane, 1,2-diamino-butane, 1,3-diamino-butane, the N-acyl, such as the N-acetyl and N-benzoyl, compounds of 1-amino-3-methylamino-propane, 1,3-diamino-2-methyl-propane, 1,3-diamino-2-hydroxy-propane, 1,5-diamino-2-carboxy-pentane, 1,3-diamino-2-phenylpropane or its derivative sulfo-substituted in the benzene radical, 1,3- or 1,4-cyclohexylene-diamine, bis-(4-amino-cyclohex-1-yl)-methane, 1,8-di-(aminomethyl)-naphthalene, 1,4-di(aminomethyl)-benzene, 1,3-di(aminomethyl)-benzene, N,N'-bis-(β-aminoethyl)-1,4-piperidine, 1,4- or 1,3-phenylenediamine, 4-aminobenzylamine, 4-amino-phenethylamine and the corresponding N-monoacyl derivatives of such compounds, and furthermore compounds corresponding to a general formula (α), (β), (γ) or (δ)

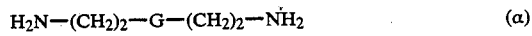

H₂N—(CH₂)₂—G—(CH₂)₂—NH₂     (α)

H₂N—(CH₃)₂—G—(CH₃)₂—NH₂     (β)

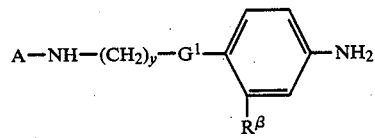

(γ)

$$H_2N-(CH_2-CH_2-NH)_y-CH_2-CH_2-NH_2 \quad (\delta)$$

in which
G denotes an oxygen atom, a sulfur atom, a sulfonyl group or a group of the formula —NH—, —N(CH$_3$)— or —N(COCH$_3$)—,
R$^\beta$ represents a hydrogen atom or a sulfo group,
A has the abovementioned meaning,
v is the number 2, 3 or 4,
G$^1$ is the group —NH— or an oxygen atom and
y denotes the number 2 or 3.

Of these, 1,2-diamino-ethane, 1,3-diamino-propane, 1,4-diamino-butane and 1,2-diamino-propane are particularly preferred.

Suitable solvents for the reaction of the halogenonitrobenzenes and the amino compounds are, for example, water, alkanols with 1 to 4 carbon atoms, dixoane, toluene, the xylenes, chlorobenzenes, o-dichlorobenzene, m-dichlorobenzene, dimethylformamide and N-methylpyrrolidone. The amine itself can also be used in excess as the solvent.

The resulting nitro compound of the general formula (10)

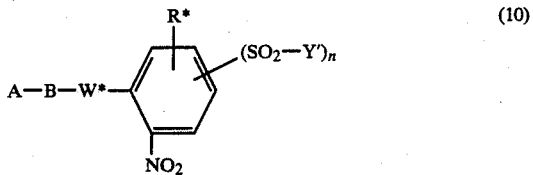

in which A, B, R*, W*, Y' and n have the abovementioned meanings, can be isolated in the customary manner, for example by crystallization from this reaction mixture or by distilling off the solvent or excess amine or by acidification and filtration. Subsequent reduction of the nitro group in the nitro compound (10) to the amino group is carried out in a manner which is known per se, thus, by catalytic hydrogenation with hydrogen on palladium, platinum or Raney nickel at a temperature between 50° and 110° C. under increased pressure, or by Béchamp reduction with iron in an acid medium, for example with iron in ethanol/glacial acetic acid. The reduction can be carried out in a solvent suitable for this, such as water, methanol or ethanol or a mixture thereof.

The amino compound contained in the hydrogenation batch can—after first separating off the catalysts or metallic reducing agents—be diazotized directly, without intermediate isolation, to give the triazole with simultaneous cyclization. The diazotization is carried out by a procedure which is customary per se, thus, for example, with sodium nitrite in a hydrochloric acid medium at a temperature between −5° C. and +15° C. Any acylamino group present in the benzotriazole compound obtained can be hydrolysed by the customary procedure, thus, for example, in an aqueous medium at a pH of more than 12 and a temperature of 90° to 100° C., to give the amino group, and thus to give the compound of the general formula (7).

The compounds of the general formula (1) prepared according to the invention can be separated off and isolated from the synthesis solutions by generally known methods, thus, for example, either by precipitation from the reaction medium by means of electrolytes, such as, for example, sodium chloride or potassium chloride, or by evaporation of the reaction solution, for example spray-drying, it being possible for a buffer substance to be added to this reaction solution.

The compounds of the general formula (1) according to the invention have fiber-reactive properties and useful dyestuff properties. They can therefore be used for dyeing (including printing) natural, regenerated or synthetic materials containing hydroxy groups and/or carboxamide groups, for example in the form of sheet-like structures, such as paper and leather, or for bulk dyeing polyamide or polyurethane, but in particular for dyeing such materials in fiber form, such as cellulose fiber materials, silk, wool and synthetic polyamide and polyurethane fibers. The solutions obtained in the synthesis of the compounds according to the invention can also be put to use for dyeing directly as a liquid preparation, if appropriate after addition of a buffer substance and if appropriate also after concentration.

The compounds of the formula (1) according to the invention can, when used according to the invention, be applied to and fixed on the substrates mentioned, in particular on the fiber materials mentioned, by the application techniques known for water-soluble, in particular fiber-reactive, dyestuffs, thus, for example, by applying the dioxazine compound of the general formula (1) in dissolved form to the substrate or incorporating it therein and fixing it on this or in this, if appropriate by the action of heat and/or if appropriate by the action of an alkaline agent. Such dyeing and fixing methods are described in numerous instances in the literature.

The present invention thus also relates to the use of the compounds of the general formula (1) according to the invention for dyeing (including printing) materials containing hydroxy and/or carboxamide groups, and to processes for their use on these substrates. The materials are preferably used in the form of fiber materials, in particular in the form of textile fibers, such as yarns, wound packages and woven fabrics. The procedure followed here can be analogous to known procedures for application and fixing of fiber-reactive dyestuffs.

The dyeings and prints produced with compounds of the general formula (1) according to the invention are distinguished by pure, predominantly blue color shades. In particular, the dyeings and prints on cellulose fiber materials have very good depth of color and also very good fastnesses to light, including good fastness to light when wet and under the influence of perspiration, as well as good fastnesses to hypochlorite bleaching and to chlorinated water, and furthermore outstanding wet fastness properties, such as, for example, good to very good fastnesses to washing at 60° to 95° C., even in the presence of perborates, fastnesses to acid and alkaline milling, cross-dyeing and perspiration, fastnesses to alkalis, acids, water and seawater, and furthermore good fastness to pleating, fastness to ironing and fastness to rubbing. They also have a good fastness to lying in the wet state and a very good stability to acid storage ("acid fading") when dyed damp material which still contains acetic acid is stored. The dyeings are moreover stable towards the customary synthetic resin finishes. Some of the compounds (dyestuffs) according to the invention are comparable in purity of the color shade and in important fastness properties to fiber-reactive anthraquinone dyestuffs.

The examples below serve to illustrate the invention. The parts are parts by weight and the percentages are percentages by weight, unless indicated otherwise.

Parts by weight bear the same relation to parts by volume as the kilogram to the liter.

EXAMPLE 1

(a) 492 parts of 3-(β-sulfoethylsulfonyl)-4-[4'-β-(β-hydroxyethylsulfonyl-phenyl)-ethylamino]-aniline are dissolved in 2000 parts of water at 60° C. to give a clear solution. 124 parts of chloranil are introduced and during the reaction a pH of 6 to 6.5 is maintained with about 90 parts of sodium bicarbonate at a reaction temperature of about 65° C. The mixture is subsequently stirred for a further hour and the reaction product is filtered off with suction at about 30° C., washed with 400 parts of water and dried under reduced pressure at 70° C.

(b) 116 parts of the product obtained under a) are introduced into 600 parts of 15% strength oleum at a temperature of between 20° and 25° C. The reaction mixture is then subsequently stirred at this temperature for about a further three hours; 48 parts of sodium peroxodisulfate are then introduced, and in particular such that the reaction temperature is kept at 20° to 25° C. The mixture is subsequently stirred at this temperature for a further 10 hours and is then allowed to run onto ice, the compound according to the invention which has precipitated out is filtered off and dissolved again in about 1000 parts of water, a pH of 5 is established with sodium carbonate and the product is salted out with sodium chloride, if appropriate after prior customary clarification of the solution.

The triphendioxazine compound according to the invention can also be obtained in the form of its sodium salt by evaporation or spray-drying of the combined filtrate. It has the following probable formula, written in the form of the free acid:

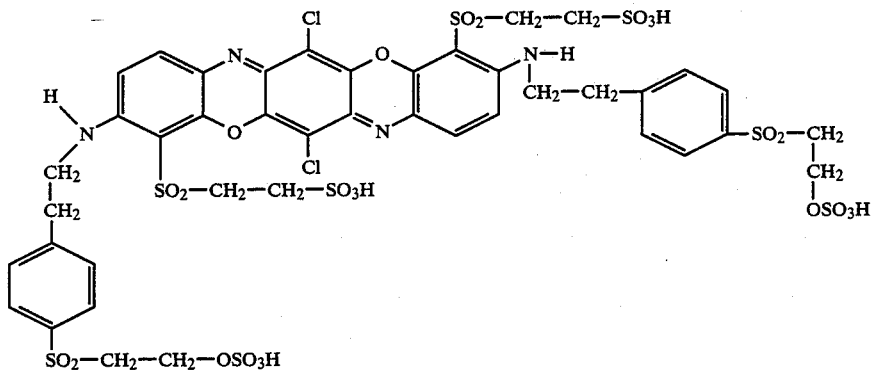

(the β-sulfoethylsulfonyl group in each case can also be bonded in the other ortho-position relative to the (β-sulfatoethylsulfonyl)-phenylethylamino group, but is more probably in the position shown in the above formula).

This compound according to the invention has very good properties as a fiber-reactive dyestuff. It dyes the materials mentioned in the description, in particular cellulose fiber materials, such as cotton, by the procedures known and customary in the art for application and fixing of fiber-reactive dyestuffs in deep, pure reddish-tinged blue shades (corresponding to color identification number 13 of the Colour Index Hue Indication Chart) with good fastness properties, such as, in particular, good fastness to light of the dry dyeing or damp dyeing, for example moistened with drinking water or with an alkaline sweat solution, fastness to chlorinated water, fastness to hypochlorite, fastness to alkaline perspiration, fastness to washing, even in the presence of perborates, fastness to lying in the wet state and stability to acid storage. In aqueous solution, it has an absorption maximum at 614 nm in the visible range.

(c) The aniline compound used under (a) can be prepared, for example, as follows:

330 parts of 3-(β-sulfoethylsulfonyl)-4-chloro-nitrobenzene are suspended in an aqueous sodium hydroxide solution prepared from 48 parts of sodium hydroxide and 2600 parts of water; 320 parts of 2-[4'-(β-hydroxyethylsulfonyl)-phenyl]-ethylamine hydrochloride are immediately introduced, with stirring, and the reaction temperature is increased to 70° C.; during the reaction, the pH is kept at 10 by means of aqueous sodium hydroxide solution. When the reaction has ended, the mixture is clarified hot and brought to a pH of 6 to 7 with dilute hydrochloric acid. Highly pure 2-(β-sulfoethylsulfonyl)-4-nitro-1-[4'-(β-hydroxyethylsulfonyl)-phenyl]ethylamino-benzene crystallizes out of the aqueous medium on cooling.

The following data are found on 1H-NMR analysis (in D$_6$-dimethylsulfoxide with tetramethylsilane as the internal standard):

δ=2.61 ppm (t, 2H); 3.05 ppm (t, 2H); 3.43 ppm (t, 2H); 3.46 ppm (t, 2H); 3.63 ppm (m, 2H); 3.70 ppm (m, 2H); 4.82 ppm (t, OH); 7.11 ppm (d, 1H); 7.27 ppm (t, NH); 7.68 ppm (d, 2H); 7.84 ppm (d, 2H); 8.24 ppm (dd, 1H); 8.36 ppm (d, 1H).

This nitro compound is reduced to the aniline compound by catalytic hydrogenation by dissolving 261 parts of the nitro compound in 1000 parts of water and hydrogenating it in the presence of a Pd/C catalyst in an autoclave at a temperature of up to 100° C. under a hydrogen pressure of 50 bar. The catalyst is then filtered off and the filtrate is acidified and cooled. A good yield of the highly pure aniline compound crystallizes out of it.

EXAMPLE 2

(a) 145 parts of 3-(β-sulfo-ethylsulfonyl)-4-[3-(β-hydroxyethylsulfonyl)-4-methoxy-phenylamino]-aniline are dissolved in 600 parts of water at 60° C. to give a clear solution. 37 parts of chloranil are introduced, and during the reaction a pH of 6 to 6.5 is maintained with about 30 parts of sodium bicarbonate at a reaction temperature of about 65° C. The mixture is subsequently stirred for a further hour and the reaction product is filtered off with suction at about 20° C., washed with 50 parts of ethanol and dried under reduced pressure at 60° C.

(b) 117 parts of the product obtained under (a) are introduced into 1000 parts of 10% strength oleum at a temperature between 20° and 25° C. The reaction mixture is then subsequently stirred at this temperature for about a further three hours; 47 parts of sodium peroxodisulfate are then introduced, and in particular such that the reaction temperature can be kept at 20° to 25° C. The mixture is subsequently stirred at this temperature for a further 10 hours and is then allowed to run onto ice, it is brought to a pH of between 1 and 1.5 with calcium carbonate and then to a pH of 5.5 with sodium carbonate, the calcium sulfate which has precipitated out is filtered off and washed out with water and the filtrates are combined.

The triphendioxazine compound according to the invention can be obtained in the form of its sodium salt by evaporation or spray-drying of the combined filtrate. It has the following probable formula, written in the form of the free acid:

phenylamino]-nitrobenzene synthesized is then salted out in a highly pure form by means of 150 parts of sodium chloride and is isolated.

$^1$H-NMR analysis (in $D_2O$): $\delta = 3.15$–$3.42$ ppm (m, 2H); 3.55–4.15 ppm (m, 9H); 6.88 ppm (d, 1H; 7.33 ppm (d, 1H); 7.68 ppm (dd, 1H); 7.8 ppm (d, 1H); 8.08 ppm (dd, 1H); and 8.55 ppm (d, 1H); the protons of the hydroxy, amino and sulfo groups were not visible.

This nitro compound can then be converted into the corresponding aniline compound by hydrogenation in the presence of a nickel catalyst, for example in methanol at a temperature of about 100° C. under a pressure of 50 bar of hydrogen.

EXAMPLE 3

(a) 523 parts of 3-($\beta$-sulfoethylsulfonyl)-4-[3-($\beta$-hydroxyethylsulfonyl)-4-($\beta$-hydroxyethylamino)-phenylamino]aniline are dissolved in 2000 parts of water at 65° C. to give a clear solution. 124 parts of

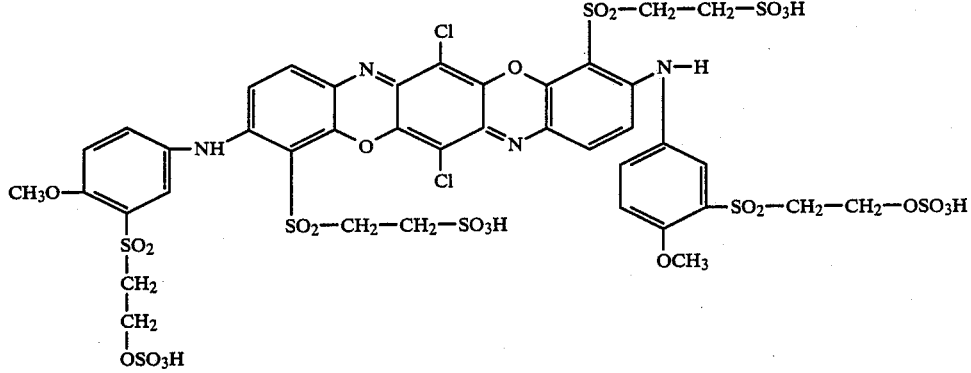

(the $\beta$-sulfoethylsulfonyl group can in each case also be bonded in the other ortho-position relative to the phenylamino group, but is more probably in the position shown in the above formula).

This compound according to the invention has very good properties as a fiber-reactive dyestuff. It dyes the materials mentioned in the description, in particular cellulose fiber materials, such as cotton, by the procedures known and customary in the art for application and fixing of fiber-reactive dyestuffs in deep, pure reddish-tinged blue shades (color identification number 13) with good fastness properties, such as, in particular, good fastness to light of the dry dyeing or damp dyeing, such as moistened with drinking water or with an alkaline sweat solution, fastness to chlorinated water, fastness to hypochlorite, fastness to alkaline perspiration, fastness to washing, even in the presence of perborates, fastness to lying in the wet state and stability to acid storage.

In aqueous solution, it has an absorption maximum at 583 nm in the visible range.

(c) The aniline compound used under (a) can be prepared, for example, as follows: 165 parts of 3-($\beta$-sulfoethylsulfonyl)-4-chloro-nitrobenzene and 116 parts of 3-($\beta$-hydroxyethylsulfonyl)-4-methoxy-aniline are heated at 100° C. in 1000 parts of water in the presence of 14 parts of magnesium oxide for 15 hours. After cooling, the mixture is clarified and acidified with concentrated hydrochloric acid; the 3-($\beta$-sulfoethylsulfonyl)-4-[3-($\beta$-hydroxyethylsulfonyl)-4-methoxychloranil are introduced, and during the reaction a pH of 6 to 6.5 is maintained with about 80 parts of sodium bicarbonate at a reaction temperature of about 65° C. The mixture is subsequently stirred for a further three hours and, after cooling, the reaction product is filtered off with suction, washed with 200 parts of water and dried at 70° C. under reduced pressure.

(b) 122 parts of the product from a) are introduced into 500 parts of 20% strength oleum at a temperature between 20° and 25° C. The reaction mixture is then subsequently stirred at this temperature for about a further 15 hours; 48 parts of sodium peroxodisulfate are then introduced, and in particular in a manner such that the reaction temperature can be kept at 20° to 25° C. The mixture is subsequently stirred at this temperature for a further 10 hours and then allowed to run onto ice, the pH is brought to between 1 and 1.5 with calcium carbonate and then to 6 with sodium carbonate, the calcium sulfate which has precipitated out is filtered off and washed out with water and the filtrates are combined. Calcium ions still in the solution can be precipitated with oxalic acid.

The triphendioxazine compound according to the invention can be obtained in the form of its sodium salt by evaporation or spray-drying of the combined filtrate or can be isolated by salting out by means of electrolyte salts, such as sodium chloride and potassium chloride. It has the following probable formula, written in the form of the free acid

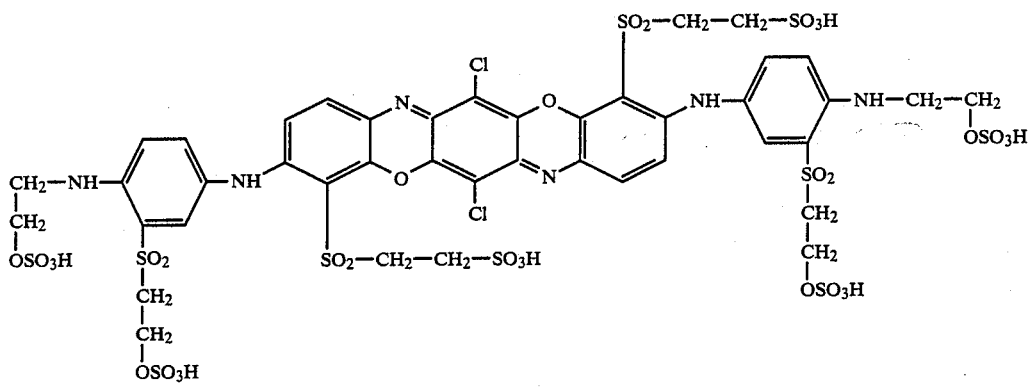

(the β-sulfoethylsulfonyl group can in each case also be bonded in the other ortho-position relative to the phenylamino group, but is more probably in the position shown in the above formula).

This compound according to the invention has very good properties as a fiber-reactive dyestuff. It dyes the materials mentioned in the description, in particular cellulose fiber materials, such as cotton, by the procedures known and customary in the art for application and fixing of fiber-reactive dyestuffs in deep, pure greenishtinged blue shades (color identification number 14) with good fastness properties, such as, in particular, good fastness to light of the dry dyeing or damp dyeing, such as moistened with drinking water, good fastness to light under the influence of alkaline perspiration, fastness to chlorinated water, fastness to hypochlorite, fastness to alkaline perspiration, fastness to washing, even in the presence of perborates, fastness to lying in the wet state and stability to acid storage.

In aqueous solution, it has an absorption maximum at 620 nm in the visible range.

(c) The aniline compound used under a) can be prepared analogously to Example 2c), 131 parts of 3-(β-hydroxyethylsulfonyl)-4-(β-hydroxyethylamino)-aniline being used as the aniline compound. After the reaction has been carried out and the mixture has been clarified at a pH of 6, hydrogenation is carried out directly in the solution.

EXAMPLES 4 TO 30

Other triphendioxazine compounds of formula (1) in which R is hydrogen, are described with the aid of their formulae radicals in the following Tabular Examples (W being identical to $W^1$). They can be prepared, according to the invention, by reacting the shown 1,4-benzoquinone compound (5) with an amino compound (4) in which R is hydrogen and and the other formula moieties can be seen from the corresponding Table-Example, by Y' is β-hydroxyethyl in place of the indicated β-sulfatoethyl for Y, and subsequently sulfating and cyclizing the product. They have likewise very good properties as fiber-reactive dyestuffs and give in particular on cellulose fiber materials deep, fast dyeings with the color shade on cotton in the particular Tabular Example (color identification number according to the Colour Index Hue Indication Chart in parentheses).

| Example | Compound of the formula (1) with ... Radical -β-W-(SO₂—Y)ₙ | T is ... | $X^1$ ... | $X^2$ is ... | Compound (5) = ...—1,4-benzoquinone | Color shade |
|---|---|---|---|---|---|---|
| 4 | β-(4-β'-sulfatoethylsulfonyl-phenyl)-ethylamino | β-sulfo-ethyl | Bromine | Bromine | 2,3,5,6-Tetra-bromo-... | reddish-tinged blue (13) |
| 5 | β-(4-β'sulfatoethylsulfonyl-phenyl)-ethylamino | β-sulfo-ethyl | Methyl | Methyl | 2,5-Dimethyl-3,6-dichloro-... | reddish-tinged blue (13) |
| 6 | β-(4-β'sulfatoethylsulfonyl-phenyl)-ethylamino | β-sulfo-ethyl | Methyl | Chlorine | 2-Methyl-3,5,6-trichloro-... | reddish-tinged blue (13) |
| 7 | 3-(β-Sulfatoethylsulfonyl)-4-methoxy-phenylamino | β-sulfo-ethyl | Bromine | Bromine | 2,3,5,6-Tetra-bromo-... | reddish-tinged blue (13) |
| 8 | 3-(β-Sulfatoethylsulfonyl)-4-methoxy-phenylamino | β-sulfo-ethyl | Methyl | Methyl | 2,5-Dimethyl-3,6-dichloro-... | reddish-tinged blue (13) |
| 9 | 3-(β-Sulfatoethylsulfonyl)-4-methoxy-phenylamino | β-sulfo-ethyl | Methyl | Chlorine | 2-Methyl-3,5,6-trichloro-... | reddish-tinged blue (13) |
| 10 | 3-(β-Sulfatoethylsulfonyl)-4-(β-sulfatoethylamino)-phenylamino | β-sulfo-ethyl | Bromine | Bromine | 2,3,5,6-Tetra-bromo-... | greenish-tinged blue(14) |
| 11 | 3-(β-Sulfatoethylsulfonyl)-4-(β-sulfatoethylamino)-phenylamino | β-sulfo-ethyl | Methyl | Methyl | 2,5-dimethyl-3,6-dichloro-... | greenish-tinged blue (14) |
| 12 | 3-(β-Sulfatoethylsulfonyl)-4-(β-sulfatoethylamino)-phenylamino | β-sulfo-ethyl | Methyl | Chlorine | 2-Methyl-3,5,6-trichloro-... | greenish-tinged blue (14) |
| 13 | 3-(β-Sulfatoethylsulfonyl)-4-(β-sulfoethylamino)-phenyl- | β-sulfo-ethyl | Bromine | Bromine | 2,3,5,6-Tetra-bromo-... | greenish-tinged |

| Example | Compound of the formula (1) with... Radical -β-W-(SO$_2$—Y)$_n$ | T is... | X$^1$ | X$^2$ is... | Compound (5) = ...—1,4-benzoquinone | Color shade |
|---|---|---|---|---|---|---|
| 14 | amino 3-(β-sulfatoethylsulfonyl)-4-(N—methyl-N—β-sulfoethyl)-amino-phenylamino | β-sulfoethyl | Chlorine | Chlorine | 2,3,5,6-Tetrachloro-... | blue (14) greenish-tinged blue (14) |
| 15 | 3-(β-Sulfatoethylsulfonyl)-4-ethylamino-phenylamino | β-sulfoethyl | Chlorine | Chlorine | 2,3,5,6-Tetrachloro-... | greenish-tinged blue (14) |
| 16 | 4-(β-Sulfatoethylsulfonyl)-benzylamino | β-sulfoethyl | Chlorine | Chlorine | 2,3,5,6-Tetrachloro-... | reddish-tinged blue (13) |
| 17 | β-(4-β'-Sulfatoethylsulfonyl-phenoxy)-ethylamino | β-sulfoethyl | Chlorine | Chlorine | 2,3,5,6-Tetrachloro-... | reddish-tinged blue (13) |
| 18 | γ-N—(2-Amino-4-β'-sulfatoethylsulfonyl)-phenylamino)-n-propyl-amino | β-sulfoethyl | Chlorine | Chlorine | 2,3,5,6-Tetrachloro- | reddish-tinged blue (13) |
| 19 | β-(β'-Sulfatoethylsulfonyl)-ethylamino | β-sulfoethyl | Chlorine | Chlorine | 2,3,5,6-Tetrachloro- | reddish-tinged blue (13) |
| 20 | γ-(β'-Sulfatoethylsulfonyl)-n-propylamino | β-sulfoethyl | Chlorine | Chlorine | 2,3,5,6-Tetrachloro-... | reddish-tinged blue (13) |
| 21 | 3-(β-sulfatoethylsulfonyl)-phenylamino | β-sulfoethyl | Chlorine | Chlorine | 2,3,5,6-Tetrachloro-... | reddish-tinged blue (13) |
| 22 | 6,8-Di-(β-sulfatoethylsulfonyl)-naphth-2'-yl-amino | β-sulfoethyl | Chlorine | Chlorine | 2,3,5,6-Tetrachloro-... | reddish-tinged blue (13) |
| 23 | 6-(β-Sulfatoethylsulfonyl)-8-sulfo-naphth-2'-yl-amino | β-sulfoethyl | Chlorine | Chlorine | 2,3,5,6-Tetrachloro-... | reddish-tinged blue (13) |
| 24 | 3-(β-Sulfatoethylsulfonyl)-4-methyl-anilino | β-sulfoethyl | Chlorine | Chlorine | 2,3,5,6-Tetrachloro-... | reddish-tinged blue (13) |
| 25 | 4-(β-Sulfatoethylsulfonyl)-phenylamino | β-sulfoethyl | Chlorine | Chlorine | 2,3,5,6-Tetrachloro-... | reddish-tinged blue (13) |
| 26 | 3-(β-Sulfatoethylsulfonyl)-4-(γ-sulfato-n-propyl-amino)-phenylamino | β-sulfoethyl | Chlorine | Chlorine | 2,3,5,6-Tetrachloro-... | reddish-tinged blue (14) |
| 27 | β-(4-β'-Sulfatoethylsulfonyl-phenyl)-ethylamino | β-sulfoethyl | Fluorine | Fluorine | 2,3,5,6-Tetrafluoro-... | reddish-tinged blue (13) |
| 28 | β-(4-β'-Sulfatoethylsulfonyl-phenyl)-ethylamino | β-Carboxyethyl | Chlorine | Chlorine | 2,3,5,6-Tetrachloro | reddish-tinged blue (13) |
| 29 | β-(4-β'-Sulfatoethylsulfonyl-phenyl)-ethylamino | β-sulfo-n-propyl | Chlorine | Chlorine | 2,3,5,6-Tetrachloro | reddish-tinged blue (13) |
| 30 | β-(4-β'-Sulfatoethylsulfonyl-phenyl)-ethylamino | Carboxymethyl | Chlorine | Chlorine | 2,3,5,6-Tetrachloro | reddish-tinged blue (13) |

EXAMPLE 31

(a) 547 parts of the compound of the formula

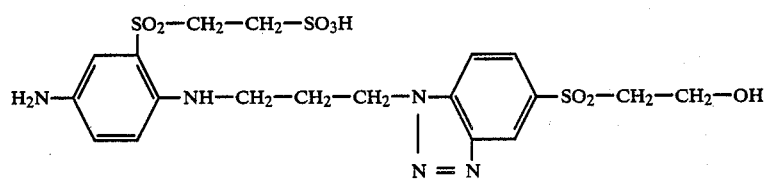

are dissolved in 2000 parts of water at pH 6° and 60° C. 124 parts of chloranil are introduced, and during the reaction a pH of 6 to 6.5 is maintained with about 90 parts of sodium bicarbonate at a reaction temperature of about 65° C. The mixture is subsequently stirred for a further 4 hours and the reaction product is filtered off with suction at about 30° C., washed with 1000 parts of water and dried under reduced pressure at 70° C.

(b) 127 parts of the product obtained under a) are introduced into 650 parts of 13% strength oleum at a temperature between 20° and 25° C. The reaction batch is then subsequently stirred at this temperature for about a further 12 hours and 48 parts of sodium peroxodisulfate are then introduced, and in particular in a manner such that the reaction temperature can be kept at 20° to 25° C. The mixture is subsequently stirred at this temperature for a further 10 hours and is then allowed to run onto ice, the compound according to the invention which has precipitated is filtered off and dissolved again in about 1000 parts of water, the pH is brought to 5 with sodium carbonate and the product is salted out with C. A high yield of highly pure sodium salt of the compound of the formula

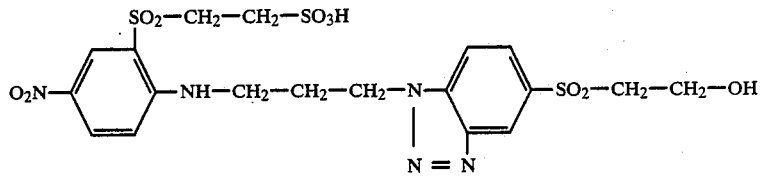

sodium chloride, if appropriate after prior customary clarification of the solution.

The triphendioxazine compound according to the invention can also be obtained in the form of its sodium salt by evaporation or spray-drying of the combined filtrate. It has the following probable formula, written in the form of the free acid crystallizes out of the aqueous medium on cooling and after addition of NaCl.

The following data are found in the 1H-NMR analysis (in D$_6$-DMSO with tetramethylsilane as the internal standard):

$\delta$=2.3 ppm (m, 2H); 2.7 ppm (m, 2H); 3.5 ppm (m, 2H); 3.6 ppm (m, 4H); 3.7 ppm (m, 2H); 4.9 ppm (t, 2H);

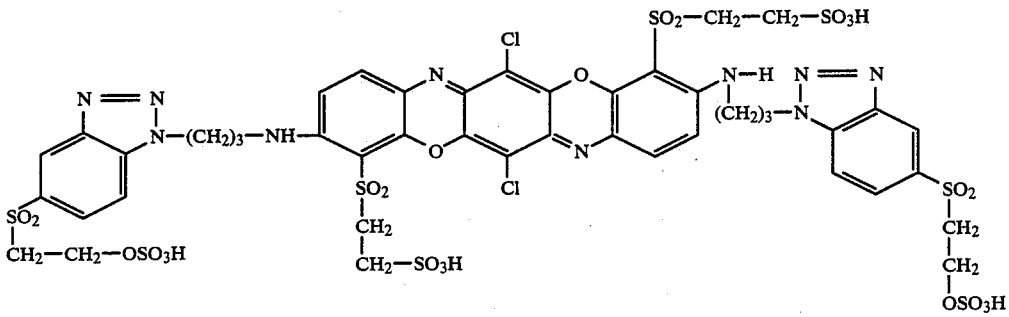

(the $\beta$-sulfoethylsulfonyl group can in each case also be bonded in the other o-position relative to the ($\beta$-sulfatoethylsulfonyl)-benzotriazolyl-propylamino group, but is more probably in the position shown in the above formula).

This compound according to the invention has very good properties as a fiber-reactive dyestuff. It dyes the materials mentioned in the description, in particular cellulose fiber materials, such as cotton, by the procedures known and customary in the art for application and fixing of fiber-reactive dyestuffs in deep, pure reddishtinged blue shades (corresponding to color identification number 13 of the Col. Index Hue Indication Chart) with good fastness properties, such as, in particular, good fastness to light of the dry dyeing or damp dyeing, such as moistened with drinking water or with an alkaline sweat solution, fastness to chlorinated water, fastness to hypochlorite, fastness to alkaline perspiration, fastness to washing, even in the presence of perborates, fastness to lying in the wet state and stability to acid storage. In aqueous solution, it has an absorption maximum at 617 nm in the visible range.

(c) The aniline compound used under a) can be prepared, for example, as follows: 352 parts of the sodium salt of 2-($\beta$-sulfoethylsulfonyl)-4-nitro-chlorobenzene are added to a mixture, preheated to 40° C., to 270 parts of $\gamma$-[5-($\beta$-hydroxyethylsulfonyl)-benzotriazol-1-yl]-n-propylamine in 1000 parts of water and 550 parts of triethanolamine. The mixture is heated up to 100° to 110° C. in the course of 3 hours, some of the water being distilled off. The mixture is subsequently stirred at 115° to 120° C. for a further 5 hours until a quantitative reaction has been achieved, 2000 parts of water are added at 100° C. and the solution is clarified at 80° to 90°

4.95 ppm (t, OH), 7.1 ppm (d, 1H); 7.37 ppm (t, NH); 8.03 ppm (dd, 1H); 8.22 ppm (d, 1H); 8.25 ppm (dd, 1H); 8.38 ppm (d, 1H); and 8.62 ppm (s, 1H).

This nitro compound is reduced to the aniline compound by catalytic hydrogenation by dissolving 289 parts of the nitro compound in 1000 parts of water and carrying out the hydrogenation in the presence of a Pd/C catalyst in an autoclave at a temperature of up to 100° C. under a hydrogen pressure of 50 bar. The catalyst is then filtered off.

The hydrogenation product can be used directly for the reaction according to (a).

(d) The 5-($\beta$-hydroxyethylsulfonyl)-benzotriazolyl-propylamino compound used under (c) can be prepared, for example, as follows: 260 parts of $\gamma$-[4-($\beta$-hydroxyethylsulfonyl)-2-aminophenylamino)]-n-propylamine are diazotized in the customary manner in about 1800 parts of a hydrochloric acid aqueous solution at 0° to 5° C. by means of an aqueous sodium nitrite solution. Cyclization takes place immediately and quantitatively. The solution can be used directly in (c). A sample isolated shows the following data on analysis by 1H-NMR (in D$_6$-DMSO with tetramethylsilane as the internal standard): $\delta$=2.24 ppm (m, 2H); 2.85 ppm (m, 2H); 3.6 ppm (m, 4H); 4.92 ppm (t, 2H); 8.04 ppm (dd, 1H); 8.27 ppm (d, 1H); 8.6 ppm (s, 1H); and mobile protons (OH, NH$_2$).

(e) The 4-($\beta$-hydroxyethylsulfonyl)-2-aminophenylaminopropylamine compound used under d) can be obtained, for example, as follows:

530 parts of 4-($\beta$-hydroxyethylsulfonyl)-2-nitrochlorobenzene are slowly introduced into 750 parts of n-propylenediamine at 70° to 80° C. After quantitative reaction, the batch is extracted by stirring, if necessary, on water and the product is filtered off with suction. A good yield of the highly pure nitro compound with a melting point of 110° to 112° C. is obtained. It has the following data on analysis by 1H-NMR (in D$_6$-DMSO with tetramethylsilane as the internal standard):

δ=1.7 ppm (m, 2H); 2.66 ppm (t, 2H); 3.5 ppm (m, 4H); 3.68 ppm (m, 2H); 7.25 ppm (d, 1H); 7.9 ppm (dd, 1H); 8.5 ppm (d, 1H); and mobile protons (NH$_2$, OH).

This nitro compound is reduced to the aniline compound by catalytic hydrogenation, hydrogenating 303 parts of the nitro compound in 1200 parts of water in the presence of a Pd/C catalyst in an autoclave at a temperature of up to 100° C. under a hydrogen pressure of 50 bar. The catalyst is then filtered off; the filtrate can be further processed directly in (d). A sample isolated has the following data on analysis by 1H-NMR (in D$_6$-DMSO with tetramethylsilane as the internal standard):

δ=1.9 ppm (m, 2H); 2.88 ppm (t, 2H); 3.2 ppm (m, 4H); 3.58 ppm (m, 2H); 6.51 ppm (dd, 1H); 6.92 ppm (d, 1H); 6.96 ppm (dd, 1H); mobile protons at 4.9 ppm (OH), 5.2 ppm (NH$_2$), 5.74 ppm (NH) and 8.2 ppm (NH$_2$).

(f) The chloronitro compound used under (c) can be obtained, for example, as follows:

260 parts of 2-(β-hydroxyethylsulfonyl)-4-nitrochlorobenzene are converted quantitatively into the sulfuric acid ester in 800 parts of 100% strength sulfuric acid and 400 parts of 20% strength oleum, and the ester is then precipitated by extraction by stirring on ice-/sodium chloride, filtered off with suction immediately, washed free from acid with 20% strength aqueous NaCl solution (yield almost quantitative) and then dissolved in 1500 parts of water at 50° C. A solution of 125 parts of Na$_2$SO$_3$ in 400 parts of water is added rapidly. After a short mixing time, precipitation takes place spontaneously. After subsequent stirring at 50° C. for 1 hour, the pH fall to about 4. The product is filtered off with suction below 10° C. and, if appropriate, dried at 80° C. under reduced pressure. It has the following data on analysis by 1H-NMR (in D$_6$-DMSO with tetramethylsilane as the internal standard):

δ=2.7 ppm (n, 2H); 3.8 ppm (m, 2H); 8.06 ppm (dd, 1H); 8.55 ppm (dd, 1H); and 8.64 ppm (d, 1H).

EXAMPLES 32 TO 70

Other triphendioxazine compounds corresponding to a general formula (1A) according to the invention

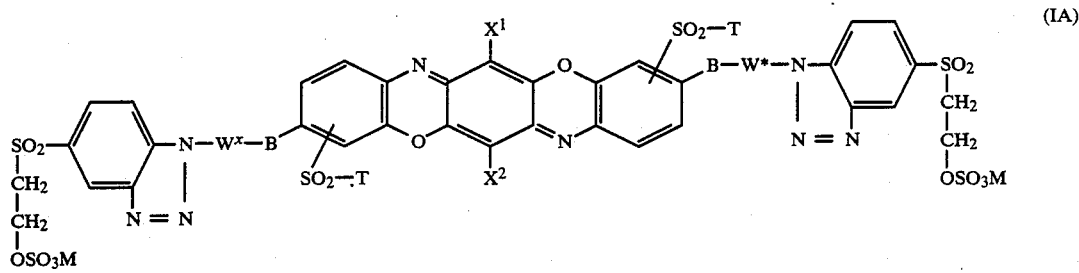

(in which M has the meaning given in the description) are described with the aid of their formulae radicals (in these, the radical W$^x$ in each case represents the "mirror image" group of the radical W* shown) in the tabular examples which follow. They can be prepared in the manner according to the invention, for example, analogously to the above embodiment examples by reaction of a 1,4-benzoquinone compound, which can be seen from the particular tabular example, corresponding to the general formula (5) with a compound of the general formula (4A)

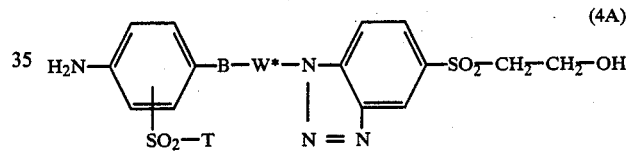

and subsequent sulfation and cyclization. These triphendioxazine compounds according to the invention likewise have very good fiber-reactive dyestuff properties and give, on the materials mentioned in the description, such as, in particular, cellulose fiber materials, deep, fast dyeings with the color shade on cotton shown in the particular tabular example (with the color identification number according to the Colour Index Hue Indication Chart shown in parentheses).

| Example | Radical B | Radical T | Radical W* | X$^1$ is... | X$^2$ is... | Compound (5) = ...1,4-benzo-quinone | Color shade |
|---|---|---|---|---|---|---|---|
| 32 | —NH— | β-Sulfoethyl | 1,2-Ethylene | Bromine | Bromine | 2,3,5,6-Tetra-bromo-... | reddish-tinged blue (13) |
| 33 | —NH— | β-Sulfoethyl | 1,2-Ethylene | Methyl | Methyl | 2,5-Dimethyl-3,6-dichloro-... | reddish-tinged blue (13) |
| 34 | —NH— | β-Sulfoethyl | 1,2-Ethylene | Methyl | Chlorine | 2-Methyl-3,5,6-trichloro-... | reddish-tinged blue (13) |
| 35 | —NH— | β-Sulfoethyl | 1,2-Ethylene | Methoxy | Methoxy | 2,3,5,6-Tetra-methoxy-... | reddish-tinged blue (13) |
| 36 | —NH— | β-Sulfoethyl | 1,2-Ethylene | Chlorine | Chlorine | 2,3,5,6-Tetra-chloro-... | reddish-tinged blue (13) |
| 37 | —NH— | β-Sulfoethyl | 1,3-Propylene | Bromine | Bromine | 2,3,5,6-Tetra-bromo-... | reddish-tinged |

-continued

| Example | Compound corresponding to formula (1A) | | | $X^1$ is... | $X^2$ is... | Compound (5) = ...1,4-benzo-quinone | Color shade |
|---|---|---|---|---|---|---|---|
| | Radical B | Radical T | Radical W* | | | | |
| 38 | —NH— | β-Sulfoethyl | 1,3-Propylene | Methyl | Methyl | 2,5-Dimethyl-3,6-dichloro-... | blue (13) reddish-tinged blue (13) |
| 39 | —NH— | β-Sulfoethyl | 1,3-Propylene | Methyl | Chlorine | 2-Methyl-3,5,6-trichloro-... | reddish-tinged blue (13) |
| 40 | —NH— | β-Sulfoethyl | —CH(CH$_3$)—CH$_2$— | Chlorine | Chlorine | 2,3,5,6-Tetrachloro-... | reddish-tinged blue (13) |
| 41 | —NH— | β-Sulfoethyl | —CH(CH$_3$)—CH$_2$— | Bromine | Bromine | 2,3,5,6-Tetrabromo-... | reddish-tinged blue (13) |
| 42 | —NH— | β-Sulfoethyl | 1,4-Butylene | Chlorine | Chlorine | 2,3,5,6-Tetrachloro-... | reddish-tinged blue (13) |
| 43 | —NH— | β-Sulfoethyl | 1,6-Hexylene | Chlorine | Chlorine | 2,3,5,6-Tetrachloro-... | reddish-tinged blue (13) |
| 44 | —NH— | β-Sulfoethyl | 2-Sulfato-1,3-propylene | Chlorine | Chlorine | 2,3,5,6-Tetrachloro-... | reddish-tinged blue (13) |
| 45 | —NH— | β-Sulfoethyl | —CH$_2$—CH$_2$—C$_6$H$_4$— | Chlorine | Chlorine | 2,3,5,6-Tetrachloro-... | reddish-tinged blue (13) |
| 46 | —NH— | β-Sulfoethyl | —(CH$_2$)$_2$—NH—C$_6$H$_4$— | Chlorine | Chlorine | 2,3,5,6-Tetrachloro-... | reddish-tinged blue (13) |
| 47 | —NH— | β-Sulfoethyl | —(CH$_2$)$_3$—NH—C$_6$H$_3$(SO$_3$H)— | Chlorine | Chlorine | 2,3,5,6-Tetrachloro-... | reddish-tinged blue (13) |
| 48 | —NH— | β-Sulfoethyl | Sulfophen-1,4-ylene | Chlorine | Chlorine | 2,3,5,6-Tetrachloro-... | greenish-tinged blue (15) |
| 49 | —NH— | β-Sulfoethyl | 1,5-Pentylene | Chlorine | Chlorine | 2,3,5,6-Tetrachloro-... | reddish-tinged blue (13) |
| 50 | —NH— | β-Sulfoethyl | —CH(C$_2$H$_5$)—CH$_2$— | Chlorine | Chlorine | 2,3,5,6-Tetrachloro-... | reddish-tinged blue (13) |
| 51 | —NH— | β-Sulfoethyl | —CH(CH$_3$)—CH$_2$—CH$_2$— | Chlorine | Chlorine | 2,3,5,6-Tetrachloro-... | reddish-tinged blue (13) |
| 52 | —NH— | β-Sulfoethyl | 2-Methyl-1,3-propylene | Chlorine | Chlorine | 2,3,5,6-Tetrachloro-... | reddish-tinged blue (13) |
| 53 | —NH— | β-Sulfoethyl | 2-Methoxy-1,3-propylene | Chlorine | Chlorine | 2,3,5,6-Tetrachloro-... | reddish-tinged blue (13) |
| 54 | —NH— | β-Sulfoethyl | —(CH$_2$)$_3$—O—(CH$_2$)$_2$—O—(CH$_2$)$_3$— | Chlorine | Chlorine | 2,3,5,6-Tetrachloro-... | reddish-tinged blue (13) |
| 55 | —NH— | β-Sulfoethyl | —(CH$_2$)$_2$—SO$_2$—(CH$_2$)$_2$— | Chlorine | Chlorine | 2,3,5,6-Tetrachloro-... | reddish-tinged blue (13) |
| 56 | —NH— | β-Sulfoethyl | —CH$_2$—C$_6$H$_4$— | Chlorine | Chlorine | 2,3,5,6-Tetrachloro-... | reddish-tinged blue (13) |

-continued

| Example | Compound corresponding to formula (1A) Radical B | Radical T | Radical W* | $X^1$ is ... | $X^2$ is ... | Compound (5) = ... 1,4-benzo-quinone | Color shade |
|---|---|---|---|---|---|---|---|
| 57 | —NH— | β-Sulfoethyl | —(CH₂)₂—N(CH₃)—(CH₂)₂— | Chlorine | Chlorine | 2,3,5,6-Tetra-chloro-... | reddish-tinged blue (13) |
| 58 | —NH— | β-Sulfoethyl | —CH₂—CH₂—NH—C₆H₃(SO₃H)— | Chlorine | Chlorine | 2,3,5,6-Tetra-chloro-... | reddish-tinged blue (13) |
| 59 | —NH— | β-Sulfoethyl | —CH(COOH)—(CH₂)₄— | Chlorine | Chlorine | 2,3,5,6-Tetra-chloro-... | reddish-tinged blue (13) |
| 60 | —NH— | β-Sulfoethyl | —(CH₂)₃—NH—(CH₂)₃— | Chlorine | Chlorine | 2,3,5,6-Tetra-chloro-... | reddish-tinged blue (13) |
| 61 | —NH— | β-Sulfoethyl | 2-methyl-5-sulfo-1,4-phenylene | Chlorine | Chlorine | 2,3,5,6-Tetra-chloro-... | greenish-tinged blue (15) |
| 62 | —NH— | β-Sulfoethyl | 1,3-Phenylene | Chlorine | Chlorine | 2,3,5,6-Tetra-chloro-... | greenish-tinged blue (15) |
| 63 | —O— | β-Sulfoethyl | 1,3-Propylene | Bromine | Bromine | 2,3,5,6-Tetra-bromo-... | bluish-tinged red (9) |
| 64 | —O— | β-Sulfoethyl | 1,3-Propylene | Chlorine | Chlorine | 2,3,5,6-Tetra-chloro-... | bluish-tinged red (9) |
| 65 | —O— | β-Sulfoethyl | 1,2-Ethylene | Chlorine | Chlorine | 2,3,5,6-Tetra-chloro-... | bluish-tinged red (9) |
| 66 | —NH— | Methyl | 4,8-disulfonaphthalene-2,6-diyl | Chlorine | Chlorine | 2,3,5,6-Tetra-chloro-... | greenish-tinged blue (15) |
| 67 | —NH— | Methyl | 2-Sulfato-1,3-propylene | Chlorine | Chlorine | 2,3,5,6-Tetra-chloro-... | reddish-tinged blue (13) |
| 68 | —NH— | Methyl | —(CH₂)₂—NH—C₆H₃(SO₃H)— | Chlorine | Chlorine | 2,3,5,6-Tetra-chloro-... | reddish-tinged blue (13) |
| 69 | —NH— | β-Carboxyethyl | —(CH₂)₂—NH—C₆H₃(SO₃H)— | Chlorine | Chlorine | 2,3,5,6-Tetra-chloro-... | reddish-tinged blue (13) |
| 70 | —NH— | 4-Sulfobenzyl | 1,3-Propylene | Chlorine | Chlorine | 2,3,5,6-Tetra-chloro-... | reddish-tinged blue (13) |

We claim:
1. A compound of the formula (4)

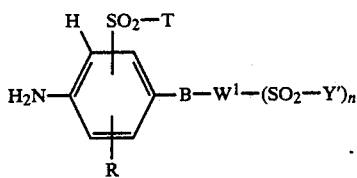

(4)

in which:
Y' is vinyl, β-hydroxyethyl or an ethyl group which contains, in the β-position, a substituent which is eliminated by an alkali;
R is a hydrogen atom or alkyl with 1 to 6 carbon atoms, alkoxy with 1 to 5 carbon atoms, halogen, carboxy, or sulfo;
n is the number 1 or 2;
T is alkyl of 1 to 6 carbon atoms with may be interrupted by 1 or 2 hetero groups selected from the group consisting of —O—, —S—, —NH—, and —N(R')—, the alkyl group T is unsubstituted or substituted by 1 or 2 substituents selected from the group consisting of chlorine, alkoxy of 1 to 4 carbon atoms, benzylamino, sulfobenzoylamino, alkanoylamino of 2 to 5 carbon atoms, hydroxy, sulfato, phosphato, acetoxy, sulfo, carboxy and phenyl unsubstituted or substituted by substituents selected from the group consisting of alkyl of 1 to 4 carbon atoms, alkoxy of 1 to 4 carbon atoms and sulfo, but with the exclusion of substituents which conform to said group Y', or
T is phenyl or naphthyl, or is phenyl or naphthyl both of which are substituted by substituents selected from the group consisting of alkyl of 1 to 4 carbon atoms, alkoxy of 1 to 4 carbon atoms, halogen, sulfo, carboxy, carbamoyl unsubstituted or monosubstituted or disubstituted by phenyl, alkyl of 1 to 4 carbon atoms, phenylalkyl with an alkyl of 1 to 4 carbon atoms and/or cycloalkyl of 5 to 8 carbon atoms, sulfamoyl unsubstituted or monosubstituted or disubstituted by phenyl, alkyl of 1 to 4 carbon atoms, phenylalkyl with an alkyl of 1 to 4 carbon atoms and/or cycloalkyl of 5 to 8 carbon atoms, trifluoromethyl, benzoylamino, sulfobenzoylamino, alkanoylamino of 2 to 5 carbon atoms, nitro and amino unsubstituted or monosubstituted or disubstituted by phenyl, alkyl of 1 to 4 carbon atoms, phenylalkyl with an alkyl of 1 to 4 carbon atoms and/or cycloalkyl of 5 to 8 carbon atoms;
B is an oxygen or sulfur atom or an amino group of the formula —NH— or —N((R')—, and
R' of formula —N(R')— in said definition of T and B is alkyl of 1 to 6 carbon atoms unsubstituted or substituted by 1 or 2 substituents selected from the group consisting of chlorine, alkoxy of 1 to 4 carbon atoms, benzoylamino, sulfobenzoylamino, alkanoylamino of 2 to 5 carbon atoms, hydroxy, sulfato, phosphato, acetoxy, sulfo, carboxy and phenyl unsubstituted or substituted by substituents selected from alkyl of 1 to 4 carbon atoms, alkoxy of 1 to 4 carbon atoms and sulfo;
$W^1$ is alkylene of 1 to 6 carbon atoms which may be interrupted by 1 or 2 hetero groups which are selected from groups of the formulae 'O—, —S—, —SO_2—, —CO—, 1,4-piperidino, —NH— and —N($R^o$)— in which $R^o$ has one of the meanings of R' or is alkanoyl of 2 to 5 carbon atoms, and the alkylene $W^1$ is unsubstituted or substituted by 1 or 2 substituents selected from the group consisting of chlorine, alkoxy of 1 to 4 carbon atoms, benzoylamino, sulfobenzoylamino, alkanoylamino of 2 to 5 carbon atoms, hydroxy, sulfato, phosphato, acetoxy, sulfo, carboxy and phenyl unsubstituted or substituted by substituents selected from alkyl of 1 to 4 carbon atoms, alkoxy of 1 to 4 carbon atoms and sulfo, or $W^1$ is an alkylene-phenylene, phenylene-alkylene, phenylene-alkylene-phenylene or alkylene-phenylene-alkylene group, the alkylene moieties of which are of 1 to 6 carbon atoms unsubstituted or substituted by 1 or 2 substituents selected from chlorine, alkoxy of 1 to 4 carbon atoms, benzoylamino, sulfobenzylamino, alkanoylamino of 2 to 5 carbon atoms, hydroxy, sulfato, phosphato, acetoxy, sulfo, carboxy and phenyl unsubstituted or substituted by substituents selected from alkyl of 1 to 4 carbon atoms, alkoxy of 1 to 4 carbon atoms and sulfo, and interrupted or non-interrupted by 1 or 2 hetero groups selected from those mentioned above, and the phenylene moieties of which are unsubstituted or substituted by 1 or 2 substituents selected from the group of substituents consisting of sulfo, carboxy, sulfamonyl carbamoyl, methyl, ethyl, methoxy, ethoxy, nitro, chlorine, amino and amino substituted by alkyl of 1 to 4 carbon atoms, phenyl and/or phenylalkyl with an alkyl of 1 to 4 carbon atoms, or $W^1$ is phenylene or naphthylene, or phenylene or naphthylene both of which are substituted by substituents selected from alkyl of 1 to 4 carbon atoms, alkoxy of 1 to 4 carbon atoms, halogen, sulfo, carboxy, sulfamoyl, carbamoyl, carbamoyl which is mono- or disubstituted by alkyl of 1 to 4 carbon atoms, phenyl, phenylalkyl with an alkyl of 1 to 4 carbon atoms and/or cycloalkyl of 5 to 8 carbon atoms, sulfamoyl which is mono- or disubstituted by alkyl of 1 to 4 carbon atoms, phenyl, phenylalkyl with an alkyl of 1 to 4 carbon atoms and/or cycloalkyl of 5 to 8 carbon atoms, trifluoromethyl, benzoylamino, sulfobenzoylamino, alkanoylamino of 2 to 5 carbon atoms, nitro, amino and amino mono- or di-substituted by alkyl of 1 to 4 carbon atoms phenyl, phenylalkyl with an alkyl of 1 to 4 carbon atoms and/or cycloalkyl of 5 to 8 carbon atoms, or $W^1$ is one of the above-mentioned alkylene and arylene moieties which are connected with one another by one of the above-mentioned hetero groups, or $W^1$ is a cycloalkylene of 5 to 10 carbon atoms unsubstituted or substituted by alkyl of 1 to 4 carbon atoms, or is an alkylene-cycloalkylene or cycloalkylene-alkylene or alkylene-cycloalkylene-alkylene the alkylene moieties of which are of 1 to 4 carbon atoms and the cycloalkylene moities of which are of 5 to 8 carbon atoms and may be substituted by alkyl of 1 to 4 carbon atoms, or $W^1$ is a group of the formula

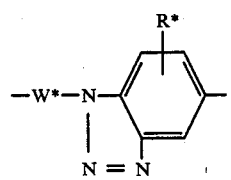

in which

R* is hydrogen, alkyl of 1 to 4 carbon atoms, alkoxy of 1 to 4 carbon atoms, halogen, carboxy or sulfo, and W* is alkylene of 1 to 6 carbon atoms which may be interrupted by 1 or 2 hetero groups which are selected from groups of the formulae —O—, —S—, —SO$_2$, —CO—, 1,4-piperidino, —NH— and —N(R$^o$)— in which R$^o$ has one of the meanings of R' —CO—, or is alkanoyl of 2 to 5 carbon atoms, and the alkylene W* is unsubstituted or substituted by 1 or 2 substituents selected from the group consisting of chlorine, alkoxy of 1 to 4 carbon atoms, benzoylamino, sulfobenzoylamino, alkanoylamino of 2 to 5 carbon atoms, hydroxy, sulfato, phosphato, acetoxy, sulfo, carboxy and phenyl unsubstituted or substituted by substituents selected from alkyl of 1 to 4 carbon atoms, alkoxy of 1 to 4 carbon atoms and sulfo, or W* is an alkylene-phenylene, phenylene-alkylene, phenylene-alkylene-phenylene or alkylene-phenylene-alkylene group, the alkylene moieties of which are of 1 to 6 carbon atoms unsubstituted or substituted by 1 or 2 substituents selected from chlorine, alkoxy of 1 to 4 carbon atoms, benzoylamino, sulfobenzoylamino, alkanoylamino of 2 to 5 carbon atoms, hydroxy, sulfato, phosphato, acetoxy, sulfo, carboxy and phenyl unsubstituted or substituted by substituents selected from alkyl of 1 to 4 carbon atoms, alkoxy of 1 to 4 carbon atoms and sulfo, and interrupted or non-interrupted by 1 or 2 hetero groups selected from those mentioned above, and the phenylene moieties of which are unsubstituted or substituted by 1 or 2 substituents selected from the group of substituents consisting of sulfo, carboxy, sulfamoyl, carbamoyl, methyl, ethyl, methoxy, ethoxy, nitro, chlorine, amino and amino substituted by alkyl of 1 to 4 carbon atoms, phenyl and/or phenylalkyl with an alkyl of 1 to 4 carbon atoms, or W* is phenylene or naphthylene, or phenylene or naphthylene both of which are substituted by substituents selected from alkyl of 1 to 4 carbon atoms, alkoxy of 1 to 4 carbon atoms, halogen, sulfo, carboxy, sulfamoyl, carbamoyl, carbamoyl which is mono- or disubstituted by phenyl, alkyl of 1 to 4 carbon atoms, phenylalkyl with an alkyl of 1 to 4 carbon atoms and/or cycloalkyl of 5 to 8 carbon atoms, sulfamoyl which is mono- or disubstituted by phenyl, alkyl of 1 to 4 carbon atoms, phenylalkyl with an alkyl of 1 to 4 carbon atoms and/or cycloalkyl of 5 to 8 carbon atoms, trifluoromethyl, benzoylamino, sulfobenzoylamino, alkanoylamino of 2 to 5 carbon atoms, nitro, amino and amino mono- or disubstituted by alkyl of 1 to 4 carbon atoms, phenyl, phenylalkyl with an alkyl of 1 to 4 carbn atoms, and/or cycloalkyl of 5 to 8 carbon atoms, or W* is one of the above-mentioned alkylene and arylene moieties which are connected with one another by one of the above-mentioned hetero groups, or W* is a cycloalkylene of 5 to 10 carbon atoms unsubstituted or substituted by alkyl of 1 to 4 carbon atoms, or is an alkylene-cycloalkylene or cycloalkylene-alkylene or alkylene-cycloalkylene-alkylene the alkylene moieties of which are of 1 to 4 carbon atoms and the cycloalkylene moieties of which are of 5 to 8 carbon atoms and may be substituted by alkyl of 1 to 4 carbon atoms;

at least one of the sulfo and sulfato groups which may be present in the molecule as mentioned above being necessarily present in the molecule.

2. A compound of formula (8)

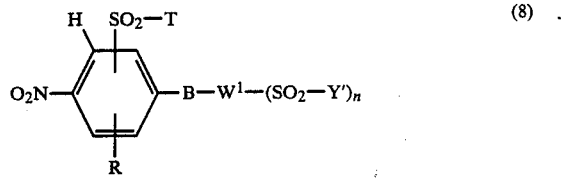

in which:

Y' is vinyl, β-hydroxyethyl or an ethyl group which contains, in the β-position, a substituent which is eliminated by an alkali;

R is a hydrogen atom or alkyl with 1 to 6 carbon atoms, alkoxy with 1 to 5 carbon atoms, halogen, carboxy, or sulfo;

n is the number 1 or 2;

T is alkyl of 1 to 6 carbon atoms with may be interrupted by 1 or 2 hetero groups selected from the group consisting of —O—, —S—, —NH—, and —N(R')—, the alkyl group T is unsubstituted or substituted by 1 or 2 substituents selected from the group consisting of chlorine, alkoxy of 1 to 4 carbon atoms, benzoylamino, sulfobenzoylamino, alkanoylamino of 2 to 5 carbon atoms, hydroxy, sulfato, phosphato, acetoxy, sulfo, carboxy and phenyl unsubstituted or substituted by substituents selected from the group consisting of alkyl of 1 to 4 carbon atoms, alkoxy of 1 to 4 carbon atoms and sulfo, but with the exclusion of substituents which conform to said group Y', or T is phenyl or naphthyl, or is phenyl or naphthyl both of which are substituted by substituents selected from the group consisting of alkyl of 1 to 4 carbon atoms, alkoxy of 1 to 4 carbon atoms, halogen, sulfo, carboxy, carbamoyl unsubstituted or monosubstituted or disubstituted by phenyl, alkyl of 1 to 4 carbon atoms, phenylalkyl with an alkyl of 1 to 4 carbon atoms and/or cycloalkyl of 5 to 8 carbon atoms, sulfamoyl unsubstituted or monosubstituted or disubstituted by phenyl, alkyl of 1 to 4 carbon atoms, phenylalkyl with an alkyl of 1 to 4 carbon atoms and/or cycloalkyl of 5 to 8 carbon atoms, trifluoromethyl, benzoylamino, sulfobenzoylamino, alkanoylamino of 2 to 5 carbon atoms, nitro and amino unsubstituted or monosubstituted or disubstituted by phenyl, alkyl of 1 to 4 carbon atoms, phenylalkyl with an alkyl of 1 to 4 carbon atoms and/or cycloalkyl of 5 to 8 carbon atoms;

B is an oxygen or sulfur atom or an amino group of the formula —NH— or —N((R')—, and R' of the formula —N(R')— in said definition of T and B is alkyl of 1 to 6 carbon atoms unsubstituted or substituted by 1 or 2 substituents selected from the group consisting of chlorine, alkoxy of 1 to 4 carbon atoms, benzoylamino, sulfobenzoylamino, alkanoylamino of 2 to 5 carbon atoms, hydroxy, sulfato, phosphato, acetoxy, sulfo, carboxy and phenyl unsubstituted or substituted by substituents selected from alkyl of 1 to 4 carbon atoms, alkoxy of 1 to 4 carbon atoms and sulfo;

W$^1$ is alkylene of 1 to 6 carbon atoms which may be interrupted by 1 or 2 hetero groups which are selected from groups of the formulae —O—, —S—, —SO₂—, —CO—, 1,4-piperidino, —NH— and —N(Rᵒ)— in which Rᵒ has one of the meanings of R' or is alkanoyl of 2 to 5 carbon atoms, and the alkylene W¹ is unsubstituted or substituted by 1 or 2 substituents selected from the group consisting of chlorine, alkoxy of 1 to 4 carbon atoms, benzoylamino, sulfobenzoylamino, alkanoylamino of 2 to 5 carbon atoms, hydroxy, sulfato, phosphato, acetoxy, sulfo, carboxy and phenyl unsubstituted or substituted by substituents selected from alkyl of 1 to 4 carbon atoms, alkoxy of 1 to 4 carbon atoms and sulfo, or W¹ is an alkylene-phenylene, phenylene-alkylene, phenylene-alkylene-phenylene or alkylene-phenylene-alkylene group, the alkylene moieties of which are of 1 to 6 carbon atoms unsubstituted or substituted by 1 or 2 substituents selected from chlorine, alkoxy of 1 to 4 carbon atoms, benzoylamino, sulfobenzoylamino, alkanoylamino of 2 to 5 carbon atoms, hydroxy, sulfato, phosphato, acetoxy, sulfo, carboxy and phenyl unsubstituted or substituted by substituents selected from alkyl of 1 to 4 carbon atoms, alkoxy of 1 to 4 carbon atoms and sulfo, and interrupted or non-interrupted by 1 or 2 hetero groups selected from those mentioned above, and the phenylene moieties of which are unsubstituted or substituted by 1 or 2 substituents selected from the group of substituents consisting of sulfo, carboxy, sulfamonyl carbamoyl, methyl, ethyl, methoxy, ethoxy, nitro, chlorine, amino and amino substituted by alkyl of 1 to 4 carbon atoms, phenyl and/or phenylalkyl with an alkyl of 1 to 4 carbon atoms, or W¹ is phenylene or naphthylene, or phenylene or naphthylene both of which are substituted by substituents selected from alkyl of 1 to 4 carbon atoms, alkoxy of 1 to 4 carbon atoms, halogen, sulfo, carboxy, sulfamoyl, carbamoyl, carbamoyl which is mono- or disubstituted by alkyl of 1 to 4 carbon atoms, phenyl, phenylalkyl with an alkyl of 1 to 4 carbon atoms and/or cycloalkyl of 5 to 8 carbon atoms, sulfamoyl which is mono- or disubstituted by alkyl of 1 to 4 carbon atoms, phenyl, phenylalkyl with an alkyl of 1 to 4 carbon atoms and/or cycloalkyl of 5 to 8 carbon atoms, trifluoromethyl, benzoylamino, sulfobenzoylamino, alkanoylamino of 2 to 5 carbon atoms, nitro, amino and amino mono- or di-substituted by alkyl of 1 to 4 carbon atoms phenyl, phenylalkyl with an alkyl of 1 to 4 carbon atoms and/or cycloalkyl of 5 to 8 carbon atoms, or W¹ is one of the above-mentioned alkylene and arylene moieties which are connected with one another by one of the above-mentioned hetero groups, or W¹ is a cycloalkylene of 5 to 10 carbon atoms unsubstituted or substituted by alkyl of 1 to 4 carbon atoms, or is an alkylene-cycloalkylene or cycloalkylene-alkylene or alkylene-cycloalkylene-alkylene the alkylene moieties of which are of 1 to 4 carbon atoms and the cycloalkylene moieties of which are of 5 to 8 carbon atoms and may be substituted by alkyl of 1 to 4 carbon atoms, or W¹ is a group of the formula

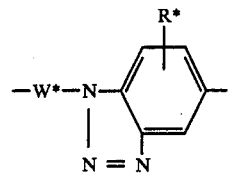

in which

R* is hydrogen, alkyl of 1 to 4 carbon atoms, alkoxy of 1 to 4 carbon atoms, halogen, carboxy or sulfo, and W* is alkylene of 1 to 6 carbon atoms which may be interrupted by 1 or 2 hetero groups which are selected from groups of the formulae —O—, —S—, —SO₂, —CO—, 1,4-piperidino, —NH— and —N(Rᵒ)— in which Rᵒ has one of the meanings of R' —CO—, or is alkanoyl of 2 to 5 carbon atoms, and the alkylene W* is unsubstituted or substituted by 1 or 2 substituents selected from the group consisting of chlorine, alkoxy of 1 to 4 carbon atoms, benzoylamino, sulfobenzoylamino, alkanoylamino of 2 to 5 carbon atoms, hydroxy, sulfato, phosphato, acetoxy, sulfo, carboxy and phenyl unsubstituted or substituted by substituents selected from alkyl of 1 to 4 carbon atoms, alkoxy of 1 to 4 carbon atoms and sulfo, or W* is an alkylene-phenylene, phenylene-alkylene, phenylene-alkylene-phenylene or alkylene-phenylene-alkylene group, the alkylene moieties of which are of 1 to 6 carbon atoms unsubstituted or substituted by 1 or 2 substituents selected from chlorine, alkoxy of 1 to 4 carbon atoms, benzoylamino, sulfobenzoylamino, alkanolamino of 2 to 5 carbon atoms, hydroxy, sulfato, phosphato, acetoxy, sulfo, carboxy and phenyl unsubstituted or substituted by substituents selected from alkyl of 1 to 4 carbon atoms, alkoxy of 1 to 4 carbon atoms and sulfo, and interrupted or non-interrupted by 1 or 2 hetero groups selected from those mentioned above, and the phenylene moieties of which are unsubstituted or substituted by 1 or 2 substituents selected from the group of substituents consisting of sulfo, carboxy, sulfamoyl, carbamoyl, methyl, ethyl, methoxy, ethoxy, nitro, chlorine, amino and amino substituted by alkyl of 1 to 4 carbon atoms, phenyl and/or phenylalkyl with an alkyl of 1 to 4 carbon atoms, or W* is phenylene or naphthylene, or phenylene or naphthylene both of which are substituted by substituents selected from alkyl of 1 to 4 carbon atoms, alkoxy of 1 to 4 carbon atoms, halogen, sulfo, carboxy, sulfamoyl, carbamoyl, carbamoyl which is mono- or disubstituted by phenyl, alkyl of 1 to 4 carbon atoms, phenylalkyl with an alkyl of 1 to 4 carbon atoms and/or cycloalkyl of 5 to 8 carbon atoms, sulfamoyl which is mono- or disubstituted by phenyl, alkyl of 1 to 4 carbon atoms, phenylalkyl with an alkyl of 1 to 4 carbon atoms and/or cycloalkyl of 5 to 8 carbon atoms, trifluoromethyl, benzoylamino, sulfobenzoylamino, alkanoylamino of 2 to 5 carbon atoms, nitro, amino and amino mono- or disubstituted by alkyl of 1 to 4 carbon atoms, phenyl, phenylalkyl with an alkyl of 1 to 4 carbon atoms, and/or cycloalkyl of 5 to 8 carbon atoms, or W* is one of the above-mentioned alkylene and arylene moieties which are connected with one another by one of the above-mentioned hetero groups, or
W* is a cycloalkylene of 5 to 10 carbon atoms unsubstituted or substituted by alkyl of 1 to 4 carbon atoms, or is an alkylene-cycloalkylene or cycloalkylene-alkylene or alkylene-cycloalkylene-alkylene the alkylene moieties of which are of 1 to 4 carbon atoms and the cycloalkylene moieties of which are of 5 to 8 carbon atoms and may be substituted by alkyl of 1 to 4 carbon atoms;

at least one of the sulfo and sulfato groups which may be present in the molecule as mentioned above being necessarily present in the molecule.

3. A compound as claimed in claim 1, in which R is a hydrogen atom.

4. A compound as claimed in claim 1, in which B is —NH—.

5. A compound as claimed in claim 1, in which $W^1$ is a β-(p-phenylene)-ethylene group or a 4-methoxy-1,3-phenylene or a 4-(β-sulfatoethylamino)-1,3-phenylene or a 4-(β-sulfoethylamino)-1,3-phenylene group.

6. A compound as claimed in claim 1, in which W* denotes the 1,2-ethylene or 1,3-propylene radical.

7. A compound as claimed in claim 1, in which T is a β-sulfoethyl group.

8. A compound as claimed in claim 1, in which T is an alkyl group with 2 or 3 carbon atoms which is substituted by a sulfo or carboxy group.

9. A compound as claimed in claim 1, in which the group —$SO_2$—T is bonded in the ortho position relative to the group —B—$W^1$—($SO_2$—Y')$_n$.

10. A compound as claimed in claim 2, in which the group —$SO_2$T is bonded in the ortho position relative to the group —B—$W^1$—($SO_2$—Y')$_n$.

* * * * *